US010298393B1

(12) United States Patent
Coraluppi

(10) Patent No.: US 10,298,393 B1
(45) Date of Patent: May 21, 2019

(54) METHOD AND APPARATUS FOR FACTORING LARGE INTEGERS

(71) Applicant: Giorgio Coraluppi, Pittsburgh, PA (US)

(72) Inventor: Giorgio Coraluppi, Pittsburgh, PA (US)

(73) Assignee: Compunetix, Inc., Monroeville, PA (US)

( * ) Notice: Subject to any disclaimer, the term of this patent is extended or adjusted under 35 U.S.C. 154(b) by 0 days.

(21) Appl. No.: 16/044,096

(22) Filed: Jul. 24, 2018

Related U.S. Application Data

(63) Continuation-in-part of application No. 15/099,306, filed on Apr. 14, 2016.

(60) Provisional application No. 62/257,045, filed on Nov. 18, 2015, provisional application No. 62/204,278, filed on Aug. 12, 2015, provisional application No. 62/154,230, filed on Apr. 29, 2015.

(51) Int. Cl.
*H04L 9/30* (2006.01)

(52) U.S. Cl.
CPC ............... *H04L 9/302* (2013.01); *H04L 9/30* (2013.01)

(58) Field of Classification Search
CPC ......... H04L 9/30; H04L 9/3006; H04L 9/302; H04L 9/3249
See application file for complete search history.

(56) References Cited

U.S. PATENT DOCUMENTS

2013/0136257 A1* 5/2013 You .................... H04L 9/302 380/30
2018/0198613 A1* 7/2018 Anderson ............... H04L 9/302

OTHER PUBLICATIONS

Burt Kaliski, "The Mathematics of the RSA Public-Key Cryptosystenn", RSA Laboratories, Feb. 2003 (Year: 2003).*

* cited by examiner

*Primary Examiner* — Matthew D Sandifer
(74) *Attorney, Agent, or Firm* — Ansel M. Schwartz

(57) ABSTRACT

This patent describes a method, apparatus and computer program which factor a large integer $N_0$ in a time of the order of $p^2 \cdot \log_p^4 N_0$, where p denotes a prime.

7 Claims, 5 Drawing Sheets

Figure 1:
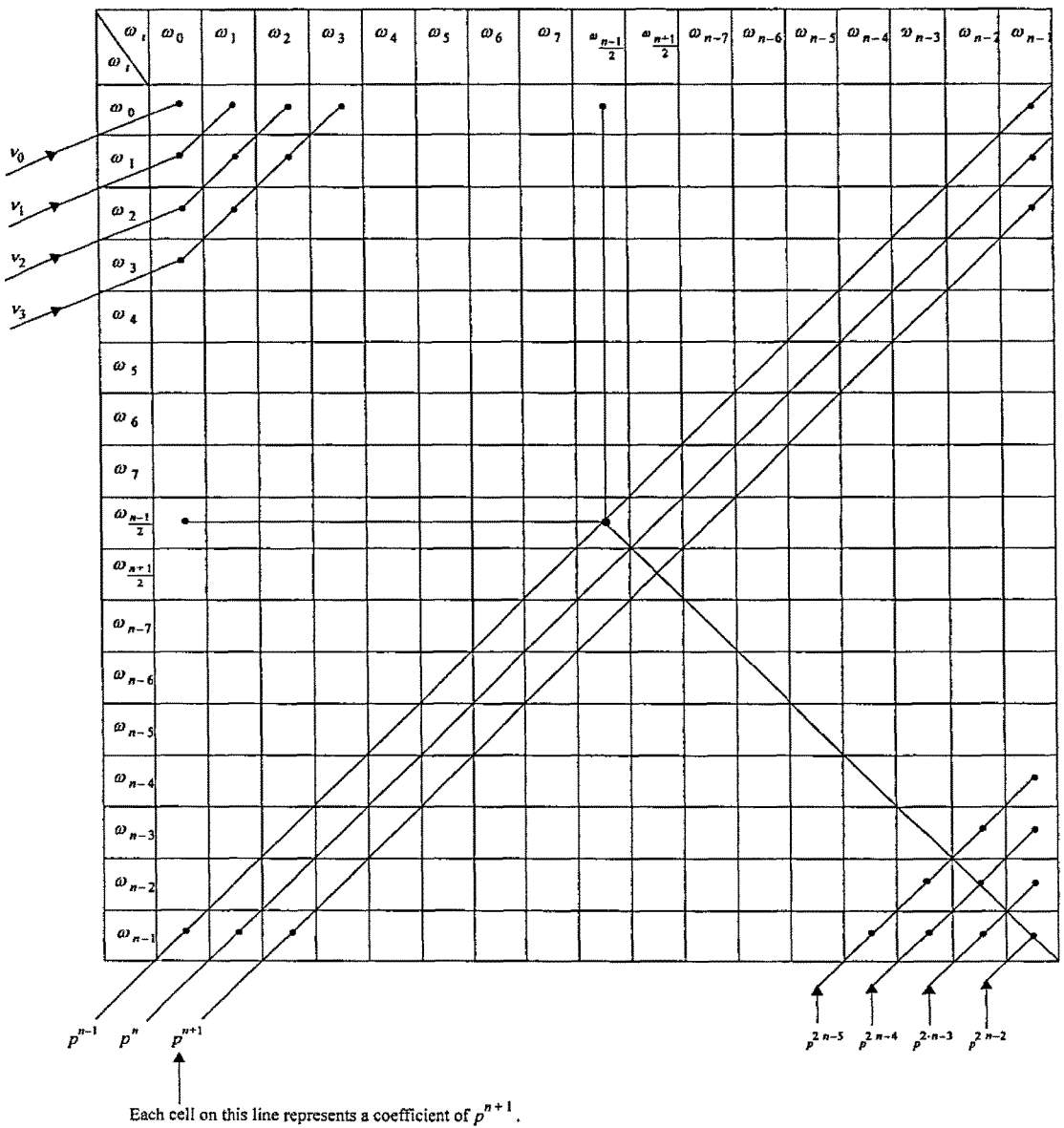

THE INTEGER $\tilde{A}^2 - N$
($n = 17$)

Each cell on this line represents a coefficient of $p^{n+1}$.

THE INTEGER $\tilde{A} \cdot (Y - \tilde{A})$
($n = 17$)

THE INTEGER $(Y-\tilde{A})^2$
($n = 17$)

THE INTEGER $X^2$
($n = 17$)

METHOD AND APPARATUS FOR FACTORING LARGE INTEGERS

CROSS-REFERENCE TO RELATED APPLICATIONS

This application is a continuation-in-part of U.S. patent application Ser. No. 15/099,306 filed Apr. 14, 2016 and claims priority from U.S. provisional applications Ser. No. 62/257,045 filed Nov. 18, 2015; 62/204,278 filed Aug. 12, 2015 and 62/154,230 filed Apr. 29, 2015, all of which are incorporated by reference herein.

I. FIELD OF THE INVENTION

The present invention is related to solving an equation in two or more unknown integer variables, where each variable is represented by a multiplicity of multiples of powers of an odd prime p. Specifically, the present invention is related to factoring an integer $N_0$ restating the problem into the factorization of an appropriate integer N which is a quadratic residue modulo p, then factoring N in a time of order of $p^2 \cdot \log_p^4 N$.

II. BACKGROUND

The problem of resolving a large integer into the product of its prime factors has stimulated the intellectual curiosity and the imagination of many generations of mathematicians.

In 1801 Gauss wrote: "... the dignity of the science itself seems to require that every possible means be explored for the solution of a problem so elegant and so celebrated." [1,397]

The problem has attracted renewed interest, ever since R. L. Rivest, A. Shamir and L. Adleman proposed an encryption method which is based on the computational difficulty of the factorization problem [2].

This note introduces a method and apparatus which allows the factorization of a large odd integer N in logarithmic time.

III. SUMMARY

The present invention pertains to a method for decoding an encrypted electromagnetic signal W encoded by a first computer with public key $N_0 = r \times s$, where $N_0$, r and s are integers and W is a function of r and s. The method comprises the steps of storing the signal W in a non-transient memory. There is the step of decoding with a second computer in communication with the memory the signal W in the memory with the second computer generated steps of selecting a prime number p of the form $p = 4k+1$ for an odd integer k such that the public key $N_0$ is a non-quadratic residue modulo p calculating $n_0$ satisfying the inequalities $p^{n_0-1} < N_0 < p^{n_0}$; computing $N = \tau N_0$ with a selection of $\tau$ such that N is a quadratic residue modulo $p^{n_0}$; calculating n satisfying the inequalities $p^{n-1} < N < p^n$ and calculating a solution to $$N \equiv A^2 \pmod{p^n} \tag{1}$$

by using the representation $$A = \sum_{i=0}^{n} \omega_i p^i \tag{2}$$

where $\omega_i$ satisfies the condition $$0 < \omega_i < p^{n-1}. \tag{3}$$

There is the step of decrypting with the second computer the signal W with the public key $N_0$ and the prime factors of integer $N_0$. There is the step of displaying on a display by the second computer the decrypted signal W. There is the step of reviewing the decrypted signal W and its relevance.

The present invention pertains to a second computer for decoding an encrypted electromagnetic signal W encoded by a first computer with public key $N_0 = r \times s$, where $N_0$, r and s are integers and W is a function of r and s, comprising:

a non-transient memory in which the signal W is stored;

decoding with a CPU in communication with the memory the signal W in the memory that decodes the signal W by the second computer generated steps of selecting a prime number p of the form $p = 4k+1$ for an odd integer k such that the public key $N_0$ is a non-quadratic residue modulo p calculating; $n_0$ satisfying the inequalities $p^{n_0-1} < N_0 < p^{n_0}$; computing $N = \tau N_0$ with a selection of $\tau$ such that N is a quadratic residue modulo $p^{n_0}$; calculating n satisfying the inequalities $p^{n-1} < N < p^n$ and calculating a solution to $$N \equiv A^2 \pmod{p^n} \tag{4}$$

by using the representation $$A = \sum_{i=0}^{n} \omega_i p^i \tag{5}$$

where $\omega_i$ satisfies the condition $$0 < \omega_i < p^{n-1}. \tag{6}$$

the CPU decrypting the signal W with the public key $N_0$ and the prime factors of integer $N_0$; and a display on which the decrypted signal W is displayed so the decrypted signal W can be reviewed to determine the relevance of the decrypted signal W. The display can be a computer screen or smart phone screen or any screen or piece of paper on which the decrypted signal W is printed or any medium on which the decrypted signal W can be reviewed.

The present invention pertains to a non-transitory readable storage medium which includes a computer program stored on the storage medium for decoding an encrypted electromagnetic signal W encoded by a first computer with public key $N_0 = r \times s$, where $N_0$, r and s are integers and W is a function of r and s, where the signal W has been stored in a non-transient memory of a second computer, having the second computer generated steps of:

selecting a prime number p of the form $p = 4k+1$ for an odd integer k such that the public key $N_0$ is a non-quadratic residue modulo p; calculating $N_0$ satisfying the inequalities $p^{n_0-1} < N_0 < p^{n_0}$; computing $N = \tau N_0$ with a selection of $\tau$ such that N is a quadratic residue modulo $p^{n_0}$; calculating n satisfying the inequalities $p^{n-1} < N < p^n$; and calculating a solution to $$N \equiv A^2 \pmod{p^n} \tag{7}$$

by using the representation $$A = \sum_{i=0}^{n} \omega_i p^i \qquad (8)$$

where $\omega_i$ satisfies the condition

There is the step of decrypting with the second computer the signal W with the public key $N_0$, and the prime factors of integer $N_0$. There is the step of displaying on a display by the second computer the decrypted signal W for predetermined words to determine the relevance of the decrypted signal W.

IV. BRIEF DESCRIPTION OF THE FIGURES

Figure 2:
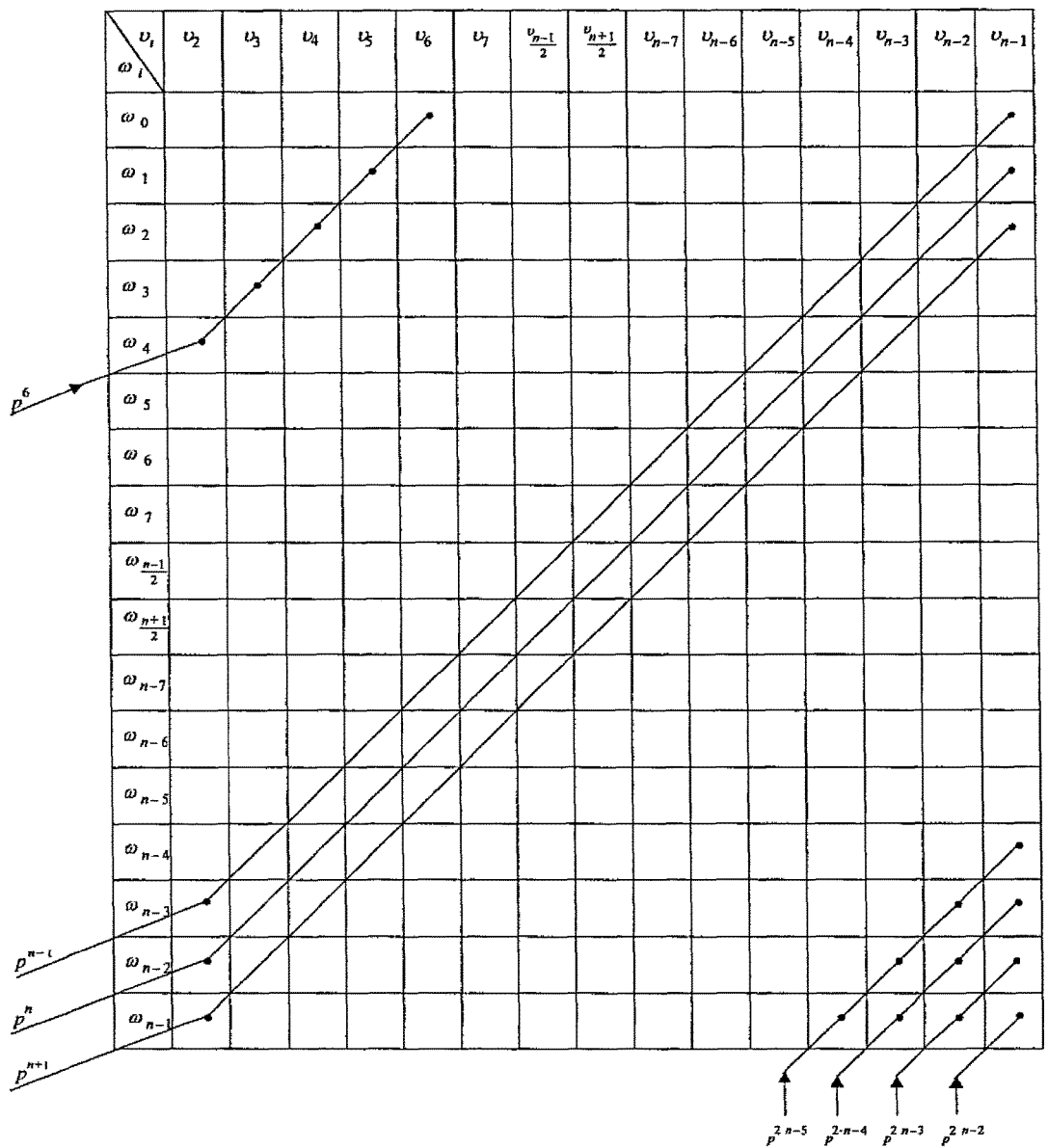
Figure 3:
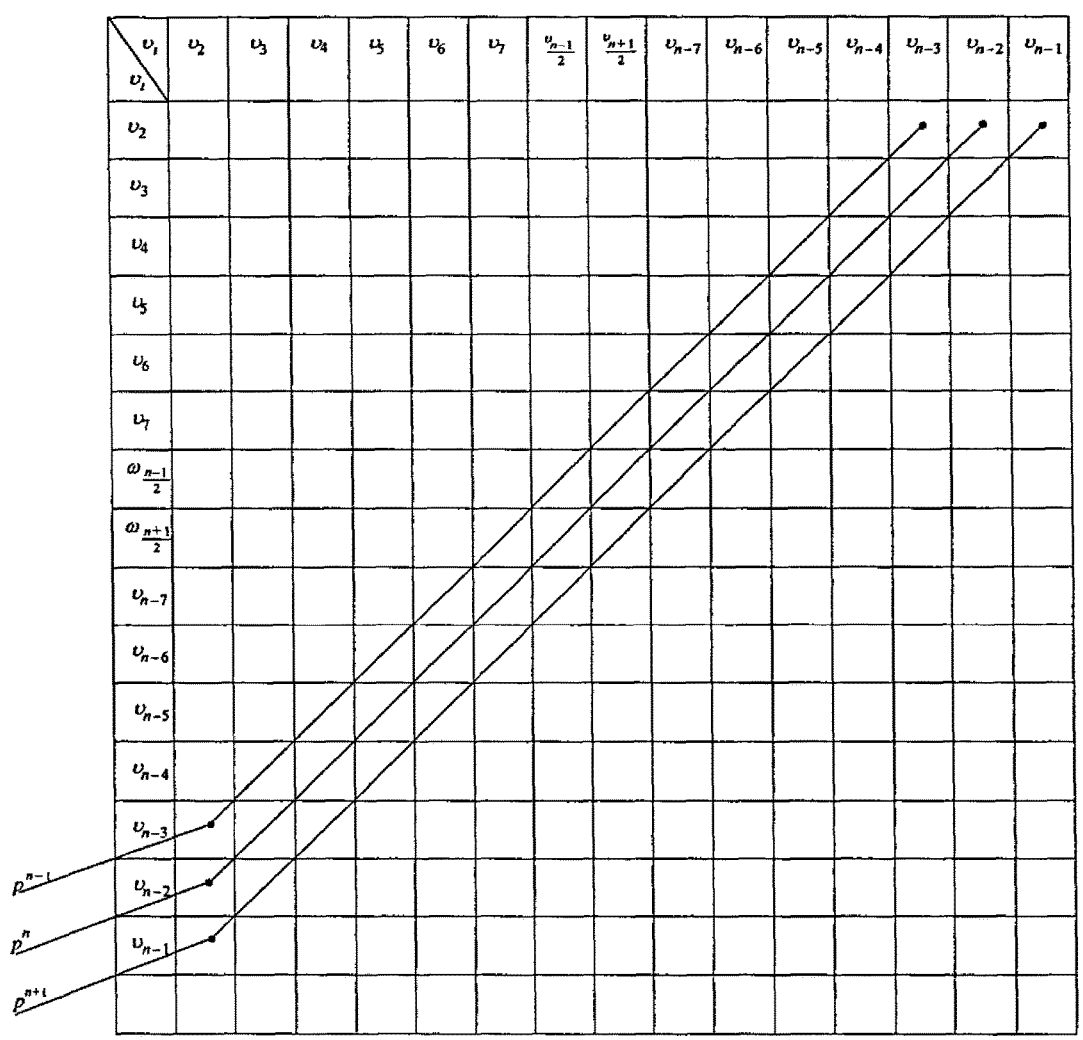
Figure 4:
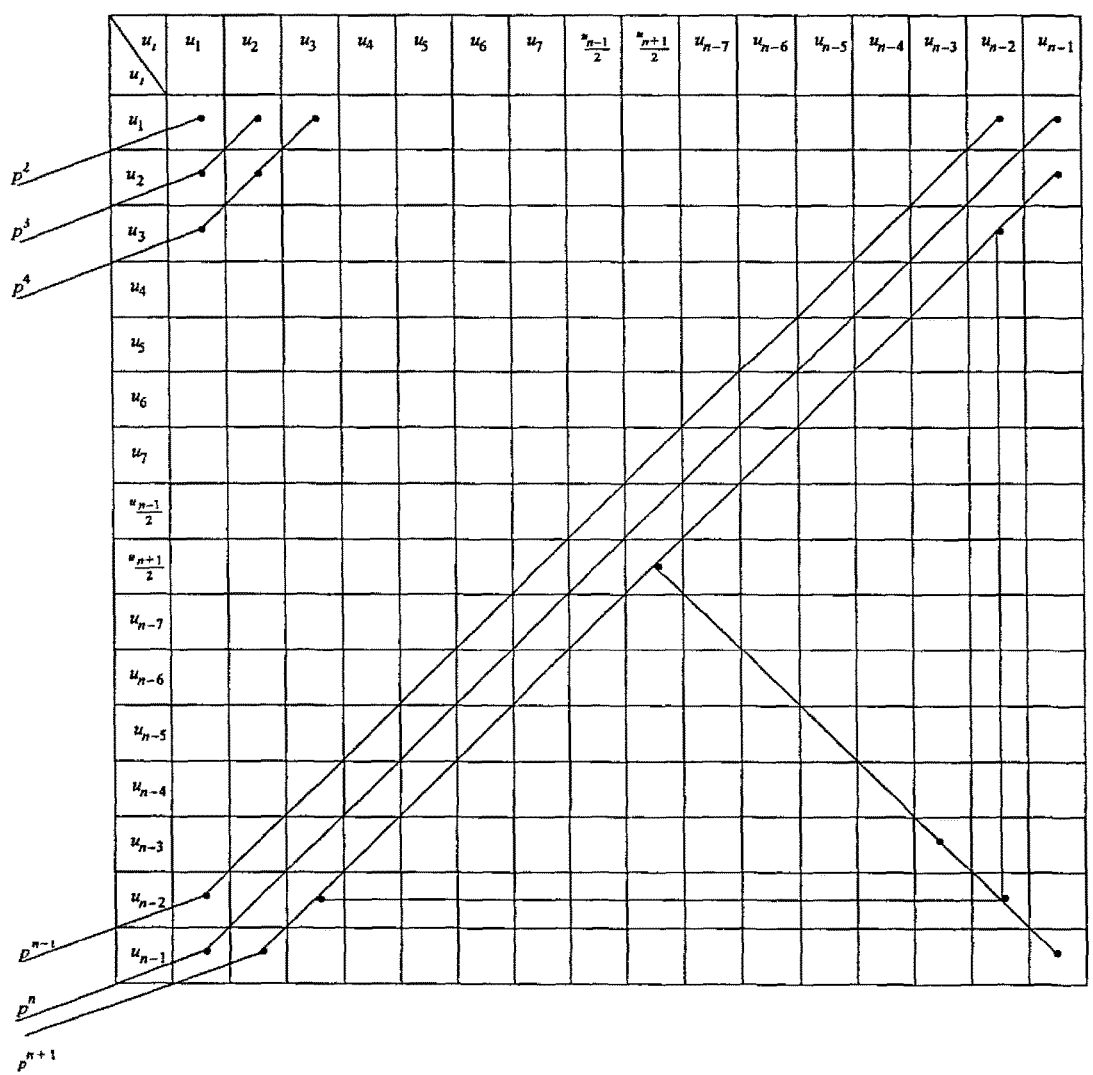
Figure 5:
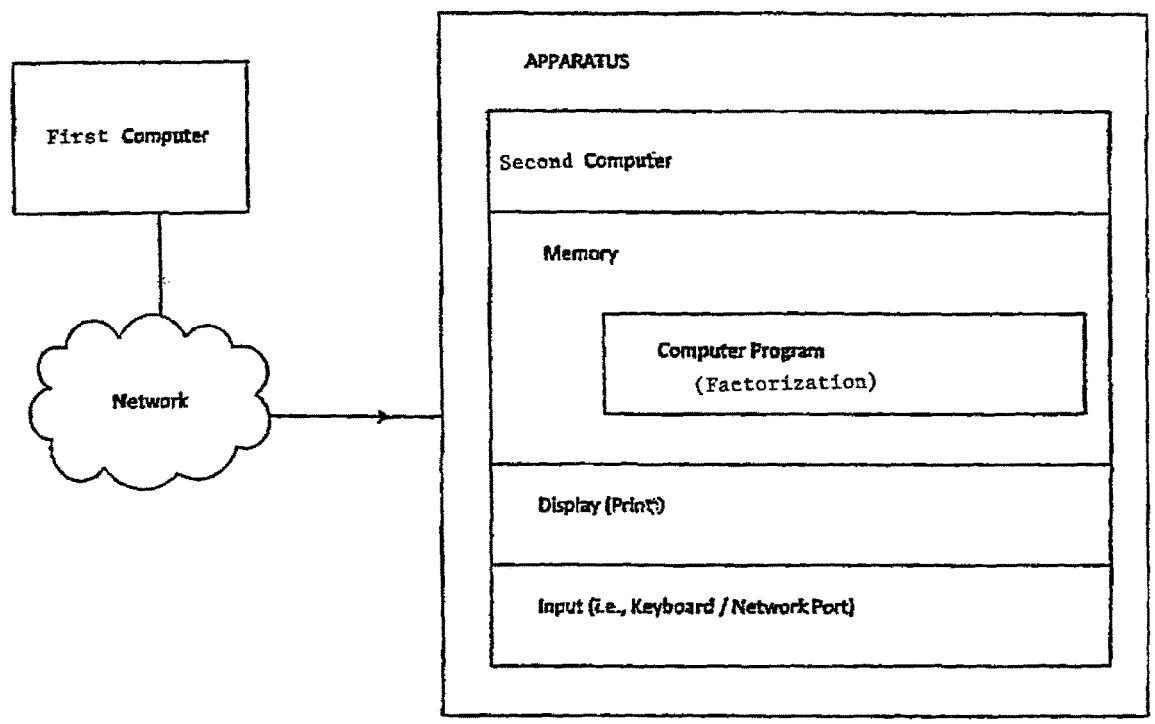

FIG. 1 is a graphical representation of the integer $\tilde{A}^2 - N$.
FIG. 2 is a graphical representation of the integer $\tilde{A}^2 \cdot (Y - \tilde{A})$.
FIG. 3 is a graphical representation of the integer $(Y - \tilde{A})^2$.
FIG. 4 is a graphical representation of the integer $X^2$.
FIG. 5 is a block diagram regarding the claimed invention.

V. DESCRIPTION OF THE INVENTION: THE PROBLEM

Given a positive odd integer $N_0$, it is desired to determine a pair of integers $r_0$ and $s_0$ such that $$N_0 = r_0 \cdot s_0. \qquad (10)$$

The problem can also be stated as the search for two integers $Y_0$ and $X_0$ such that $$N_0 = Y_0^2 - X_0^2. \qquad (11)$$

The pairs $(r_0, s_0)$ and $(Y_0, X_0)$ are related as follows:

$$\begin{cases} Y_0 = \dfrac{r_0 + s_0}{2} \\ X_0 = \dfrac{r_0 - s_0}{2} \end{cases} \qquad (12)$$

Conversely, $$\begin{cases} r_0 = Y_0 + X_0 \\ s_0 = Y_0 - X_0 \end{cases} \qquad (13)$$

If $r_0 > s_0 > 0$, both $Y_0$ and $X_0$ are positive. In this case it is useful to consider some limit cases in order to develop an appreciation for the magnitude of the variables.

One of the limit cases occurs when the pair $(r_0, s_0)$ is a pair of "twin primes", such as (43, 41). In these cases, $$\begin{cases} X_0 = 1 \\ Y_0 = \sqrt{N_0 + 1} \end{cases} \qquad (14)$$

At the other end is the case when $r_0$ approximates $N_0$. At the limit, consider a pair $(r_0, s_0)$ equaling $(N_0, 1)$. Then $$\begin{cases} X_0 = \dfrac{N_0 - 1}{2} \\ Y_0 = \dfrac{N_0 + 1}{2} \end{cases} \qquad (15)$$

Therefore, in all cases $$\begin{cases} X_0^2 < Y_0^2 \\ 1 \le X_0^2 < \left(\dfrac{N_0 - 1}{2}\right)^2 \\ N_0 + 1 \le Y_0^2 < \left(\dfrac{N_0 + 1}{2}\right)^2 \end{cases} \qquad (16)$$

Thus, in all cases, $Y_0^2 > N_0$. In some cases, $X_0^2$ is greater than $N_0$.

VI. A RESTATEMENT

Given $N_0$ and an odd prime p, the general solution of (10) has the following form:

$$\begin{cases} r_0 = \alpha + \lambda_0 \cdot p \\ s_0 = \beta + \mu_0 \cdot p \end{cases} \qquad (17)$$

where $\alpha$, $\beta$, $\lambda_0$ and $\mu_0$ denote integers and where $\alpha \cdot \beta \equiv N_0$ (mod p). If $\alpha$ and $\beta$ are both even or both odd, $\lambda_0$ and $\mu_0$ have the same parity. Otherwise, define $\beta' = \beta + p$ and $\mu'_0 = \mu_0 - 1$. Thus, without loss of generality, it is possible to define two integers $U_0$ and $V_0$ as follows:

$$\begin{cases} U_0 = \dfrac{\lambda_0 - \mu_0}{2} \\ V_0 = \dfrac{\lambda_0 + \mu_0}{2} \end{cases} \qquad (18)$$

Then $$\begin{cases} r_0 = \alpha + U_0 \cdot p + V_0 \cdot p \\ s_0 = \beta - U_0 \cdot p + V_0 \cdot p \end{cases} \qquad (19)$$

The integers $V_0$ and $U_0$ are usually referred to as the symmetric and antisymmetric to components of the pair $(r_0, s_0)$, respectively. In general, in the search for $(U_0, V_0)$, all values of $\alpha$ in the interval $1 \le \alpha < p$ may need to be tested.

The complexity of the problem is reduced in the cases when $$\begin{cases} \alpha \equiv \beta \pmod{p} \\ \alpha \cdot \beta \equiv N_0 \pmod{p^2} \end{cases} \qquad (20)$$

In such cases $V_0 \equiv 0 \pmod{p}$.

In order to realize this situation, it is possible to restate the problem of factoring $N_0$ into the problem of factoring some integer N which satisfies (20). To this end, select a prime p such that $N_0$ is a non-quadratic residue modulo p. It will be $p^{n_0-1} < N_0 < p^{n_0}$, for some integer $n_0$. Select a candidate value of $\alpha$, say $\tilde{\alpha}$. Then define $\tau$ by the following:

$$N_0 \equiv \tau \cdot \tilde{\alpha}^2 \pmod{p^2}. \qquad (21)$$

Let $\tilde{\tau}$ denote the least positive residue of (21) modulo $p^2$. Then $\beta \equiv \tilde{\tau} \cdot \tilde{\alpha} \pmod{p}$. Since $N_0$ is a non-quadratic residue modulo p, so is $\tilde{\tau}$. If $\tilde{\tau}$ is odd, define the integer N by the following $$N = \tilde{\tau} \cdot N_0 \qquad (22)$$

where, for some integer n, $p^{n-1} < N < p^n$. Then N is a quadratic residue modulo p and $$N \equiv \tilde{\tau}^2 \cdot \tilde{\alpha}^2 \pmod{p^2}. \quad (23)$$

If $p = 4 \cdot k + 1$, then $\tilde{\tau} \not\equiv \pm 1 \pmod{p}$ for all $\tilde{\alpha}$ and $\tilde{\tau}^2 \not\equiv 1 \pmod{p}$.

The integer $\tilde{\tau}^2 \cdot \tilde{\alpha}^2$ can be partitioned into the product of $\tilde{\tau} \cdot \tilde{\alpha}$ by $\tilde{\tau} \cdot \tilde{\alpha}$ or $-\tilde{\tau} \cdot \tilde{\alpha}$ by $-\tilde{\tau} \cdot \tilde{\alpha}$, yielding $$\begin{cases} r = \tilde{\tau} \cdot \tilde{\alpha} + U \cdot p + V \cdot p^2 \\ s = \tilde{\tau} \cdot \tilde{\alpha} - U \cdot p + V \cdot p^2 \end{cases}, \quad (24)$$

where $$\begin{cases} r = \tilde{\tau} \cdot r_0 \\ s = s_0 \end{cases} \quad (25)$$

and where U and V denote integers. Similar relationships hold if $r \equiv s \equiv -\tilde{\tau} \cdot \tilde{\alpha} \pmod{p}$.

Notice that, if $U > 0$, $r > s$.

In the case of (24), it will be $$\begin{cases} Y = \tilde{\tau} \cdot \tilde{\alpha} + V \cdot p^2 \\ X = U \cdot p \end{cases}. \quad (26)$$

Also, since $\tilde{\tau}$ is odd, $$\begin{cases} Y = \dfrac{\tilde{\tau} \cdot r_0 + s_0}{2} \\ X = \dfrac{\tilde{\tau} \cdot r_0 - s_0}{2} \end{cases}. \quad (27)$$

The factorization problem requires the identification of a pair $(\tilde{U}, \tilde{V})$ such that, for the corresponding $(\tilde{r}, \tilde{s})$, is it $$N = \tilde{r} \cdot \tilde{s}. \quad (28)$$

If, using the given $\tilde{\alpha}$, the algorithm were successful in factoring N, then $\tilde{r}$ would be divisible by $\tilde{\tau}$ and $\tilde{r}/\tilde{\tau} = r_0$.

NOTE 1: There is the possibility that $\tilde{\tau} \cdot \tilde{\alpha}$ be divisible by some integer $t_1 = 1 + h \cdot p$ with $0 < h < p$. In this case, the product $\tilde{\tau}^2 \cdot \tilde{\alpha}^2$ may be partitioned into the pair $$\left( \dfrac{\tilde{\tau} \cdot \tilde{\alpha}}{t_1}, t_1 \cdot \tilde{\tau} \cdot \tilde{\alpha} \right),$$

which satisfies the second of (20). This case will not be considered here because the pair (X, Y) would not be represented as in (26).

It should be noted that the proposed restatement of the problem is motivated by the convenience of using search tools such as (24) and (26), which operate on lattices of rectangular cells of sides p and $p^2$.

NOTE 2: In general, all the values of a should be tested. Since $N_0$ is a non-quadratic residue modulo p, it is sufficient to test the values of a which are non-quadratic residues modulo p.

NOTE 3: In order to avoid singular cases, it is convenient to select p in such a way that, for all non-quadratic residues modulo p, it is $$\alpha^2 \not\equiv 1 \pmod{p^2}. \quad (29)$$

Such is the case when 2 is a primitive root modulo p.

The prime p was selected of the form $4 \cdot k + 1$. Also, it has been shown that the integer 2 is a primitive of the primes of the form $8 \cdot h \pm 3$ [3, p.79]. Therefore, 2 is a primitive of the primes defined by $$8 \cdot h \pm 3 = 4 \cdot k + 1 \quad (30)$$

or $$p = 4 \cdot \text{ODD} + 1. \quad (31)$$

NOTE 4: In general, in (24) the product $\tilde{\tau} \cdot \tilde{\alpha}$ can be replaced by any integer A such that $A \equiv \tilde{\tau} \cdot \tilde{\alpha} \pmod{p^2}$ and $N = \tilde{\tau} \cdot N_0 \equiv A^2 \pmod{p^2}$. In particular, such is the case when $$N \equiv \tilde{\tau}^2 \cdot \tilde{\alpha}^2 \pmod{p^2}$$
$$\equiv \tilde{A}^2 \pmod{p^2}. \quad (32)$$

Consider the expression of Y when $\tilde{A}$ is used in lieu of $\tilde{\tau} \cdot \tilde{\alpha}$:

$$Y = \tilde{\tau} \cdot \tilde{\alpha} + V \cdot p^2$$
$$= \tilde{A} + V_1 \cdot p^2 \quad (33)$$

for some integer $V_1$.

Recall that, by (16), $$\sqrt{N} < Y < N. \quad (34)$$

There are two significant particular cases: If $\tilde{A} < \sqrt{N}$, then $V_1 > 0$. Also, if $\tilde{A} > N$, then $V_1 < 0$. Throughout this presentation, $\tilde{A}$ will be greater than N. For simplicity of notation, the integer V will be constrained to be positive. Then (24) takes the following form:

$$\begin{cases} \tilde{A} > N \\ r = \tilde{A} + U \cdot p - V \cdot p^2 \\ s = \tilde{A} - U \cdot p - V \cdot p^2 \end{cases}. \quad (35)$$

NOTE 5: A particular definition of N can be produced when $\tau$ is computed modulo $p^{n_0}$. In this case, define the integer to $T_0$ by the following:

$$N_0 \equiv T_0 \cdot \alpha^2 \pmod{p^{n_0}}. \quad (36)$$

Let $\tilde{T}_0$ denote the least positive residue of $T_0$ modulo $p^{n_0}$. It will be $$\tilde{T}_0 \equiv N_0 \cdot \alpha^{-2} \pmod{p^{n_0}}$$
$$\equiv \tilde{\tau} \pmod{p^2}. \quad (37)$$

If $\tilde{T}_0$ is odd let $$\begin{cases} N_{T_0} = \tilde{T}_0 \cdot N_0 \\ p^{n_{T_0} - 1} < N_{T_0} < p^{n_{T_0}} \\ r = \tilde{T}_0 \cdot r_0 \\ s = s_0 \end{cases}. \quad (38)$$

In this case, the magnitude of $N_{T_0}$ is of the order of $N_0^2$.

NOTE 6: Consider the case where, after the selection of p and $\tilde{\alpha}$, the integer U is selected or computed to be $U \equiv \tilde{u}_{1,1} \pmod{p}$. In this case it would be possible to define an integer $\tau_2$ as the least positive solution of the following:

$$N_0 \equiv \tau_2 \cdot (\tilde{\alpha} + \tilde{u}_{1,1} \cdot p)^2 \pmod{p^4}. \quad (39)$$

Then N could be defined as follows:

$$N = \tilde{\tau}_2 \cdot N_0$$
$$= (\tilde{\tau}_2 \cdot r_0) \cdot s_0 \quad (40)$$

and (24) could be replaced by the following:

$$\begin{cases} r = \tilde{\tau}_2 \cdot (\tilde{\alpha} + \tilde{u}_{1,1} \cdot p) + U_2 \cdot p^2 + V_4 \cdot p^4 \\ s_0 = \tilde{\tau}_2 \cdot (\tilde{\alpha} + \tilde{u}_{1,1} \cdot p) - U_2 \cdot p^2 + V_4 \cdot p^4 \end{cases}, \quad (41)$$

for some integers $U_2$ and $V_4$.

NOTE 7: There is the possibility that the solution $\tilde{\tau}$ of (21) be even. In this case, let $$\bar{\tau} = p^2 - \tilde{\tau}$$
$$> 0. \quad (42)$$

Then $\bar{\tau}$ is odd. Thus, $-\bar{\tau}$ may be used in lieu of $\tilde{\tau}$ in (22) and in (24).

As an example, let $N_0 = 73 \cdot 71 = 5,183$. If $p = 29$, $73 = 15 + 2 \cdot p$ and $71 = 13 + 2 \cdot p$.

For $\tilde{\alpha} = 15$, $\tau$ is defined by $N_0 \equiv \tau \cdot 15^2 \pmod{p^2}$. The least positive solution is $\tilde{\tau} = 722$. It will be $\bar{\tau} = p^2 - \tilde{\tau} = 119$. Then $-N_0 \equiv (p^2 - \tilde{\tau}) \cdot 15^2 \pmod{p^2}$ and $-N_0 \cdot (p^2 - \tilde{\tau}) \equiv (p^2 - \tilde{\tau})^2 \cdot 15^2 \pmod{p^2}$. Therefore, in this case, define $$N = -(p^2 - \tilde{\tau}) \cdot N_0. \quad (43)$$

Then (24) takes the following form $$\begin{cases} r = (p^2 - \tilde{\tau}) \cdot \tilde{\alpha} + U \cdot p + V \cdot p^2 \\ s = (p^2 - \tilde{\tau}) \cdot \tilde{\alpha} - U \cdot p + V \cdot p^2 \end{cases} \quad (44)$$

where $$\begin{cases} r = (p^2 - \tilde{\tau}) \cdot r_0 \\ s = -s_0 \end{cases}. \quad (45)$$

Consider an algorithm which determines the pair $(r, s)$ by successive approximations. In particular, consider the case when a candidate solution of $s$ is determined sequentially modulo $p, p^2, \ldots, p^k$. In such a case, it is convenient to verify, at each step, whether a proposed candidate solution yields a divisor of $N_0$. Let $\hat{s}$ denote the least positive residue of $s$ modulo $p^k$. Then let $\hat{s}_0 = p^k - \hat{s}$ and verify whether $\gcd(\hat{s}_0, N_0) \neq 1$.

In this presentation, without loss of generality, it will be assumed that $\tilde{\tau}$ is a positive odd integer.

VII. A NOTE ON THE REPRESENTATION OF N

Given $p^{n-1} < N < p^n$, where N is a quadratic residue modulo $p$, let $$N = \sum_{i=0}^{n-1} v_i \cdot p^i, \quad (46)$$

where $\{v_i\}$ denote integers, and $0 \leq v_i \leq p$.

It is desired to compute a solution of the following:

$$N \equiv A^2 \pmod{p^n} \quad (47)$$

where $$A \equiv \sum_{i=0}^{n-1} a_i \cdot p^i \pmod{p^n}, \quad (48)$$

and where $$0 \leq a_i < p. \quad (49)$$

Subject to (49), the solution of (47) is provided by the following:

$$\begin{cases} v_0 \equiv a_0^2 & \pmod{p} \\ v_1 \equiv 2 \cdot a_0 \cdot a_1 + \dfrac{a_0^2 - v_0}{p} & \pmod{p} \\ v_2 \equiv 2 \cdot a_0 \cdot a_2 + a_1^2 + \dfrac{RH_1 - LH_1}{p} & \pmod{p} \\ \ldots \\ v_i \equiv \sum_{k=0}^{t} a_k \cdot a_{i-k} + \dfrac{RH_{i-1} - LH_{i-1}}{p} & \pmod{p} \\ \ldots \\ v_{n-1} \equiv \sum_{k=0}^{n-1} a_k \cdot a_{n-k} + \dfrac{RH_{n-2} - LH_{n-2}}{p} & \pmod{p} \end{cases}, \quad (50)$$

where $RH_i$ and $LH_i$ denote the RHS and LHS, respectively, of the congruence containing $v_i$.

The terms $(RH_i - LH_i)/p$ are usually referred to as carries. They are caused by the constraint (49) and flow from the less significant digits to the more significant ones.

As an example, consider the problem of solving $$N \equiv A^2 \pmod{p^5}, \quad (51)$$

where N is a quadratic residue modulo p. Assume $p = 13$ and $$N = \sum_{i=0}^{4} v_i \cdot p^i \quad (52)$$
$$= 10 + 2 \cdot p + 10 \cdot p^2 + 5 \cdot p^3 + 0 \cdot p^4$$
$$= 12,711$$

If $0 \leq a_i < p$, a solution of (51), say $\tilde{A}$, can be represented as follows:

$$\tilde{A} = 6 + 0 \cdot p + 3 \cdot p^2 + 10 \cdot p^3 + 5 \cdot p^4. \quad (53)$$

A second solution of (51) occurs when $\tilde{\alpha}_0 = 6$ is replaced by $\bar{\alpha}_0 = p - \tilde{\alpha}_0 = 7$. In this case $$\bar{A} = 7 + 12 \cdot p + 9 \cdot p^2 + 2 \cdot p^3 + 7 \cdot p^4. \quad (54)$$

Consider removing the magnitude constraints (49) from all $\alpha_i$ and representing A as $$A \equiv \omega_0 + \omega_1 \cdot p + \omega_2 \cdot p^2 + \omega_3 \cdot p^3 \omega_4 \cdot p^4 \pmod{p^5}, \quad (55)$$

where the coefficients of any power of p are positive integers and are constrained by the following conditions:

$$0 < \omega_i < p^{n-i}. \quad (56)$$

Then the congruence (51) can be satisfied if the sum of the coefficients of any power of p, say $p^i$, is congruent to zero modulo $p^{5-i}$. Specifically, in the example, it must be $$\begin{cases} v_0 \equiv \omega_0^2 \pmod{p^5} \\ v_1 \cdot p \equiv 2 \cdot \omega_0 \cdot \omega_1 \cdot p \pmod{p^5} \\ v_2 \cdot p^2 \equiv \omega_1^2 \cdot p^2 + 2 \cdot \omega_0 \cdot \omega_2 \cdot p^2 \pmod{p^5} \\ v_3 \cdot p^3 \equiv 2 \cdot \omega_1 \cdot \omega_2 \cdot p^3 + 2 \cdot \omega_0 \cdot \omega_3 \cdot p^3 \pmod{p^5} \\ v_4 \cdot p^4 \equiv \omega_2^2 \cdot p^4 + 2 \cdot \omega_1 \cdot \omega_3 \cdot p^4 + 2 \cdot \omega_0 \cdot \omega_4 \pmod{p^5} \end{cases} \quad (57)$$

In the example, consider the condition $$10 \equiv \omega_0^2 \pmod{p^5}. \quad (58)$$

For $\omega_0 \equiv 6 \pmod{p}$, the least positive solution, say $\tilde{\omega}_0$, is $\tilde{\omega}_0 = 181{,}200$. For $\overline{\omega}_0 \equiv p - 6 \equiv 7 \pmod{p}$, it is $\overline{\omega}_0 = 190{,}043$.
To satisfy the second of (57) when $\omega_0 = 181{,}200$, it must be $$2 \cdot p \equiv 2 \cdot \tilde{\omega}_0 \cdot \omega_1 \cdot p \pmod{p^5}.$$

The least positive solution, say $\tilde{\omega}_1$, is $\tilde{\omega}_1 = 18{,}120$.
Thereafter, from the third of (57), let $$10 \cdot p^2 \equiv (\tilde{\omega}_1^2 + 2 \cdot \tilde{\omega}_0 \cdot \omega_2) \cdot p^2 \pmod{p^5},$$

whence $\tilde{\omega}_2 = 1{,}814$.
Likewise, from the fourth of (57), let $$5 \cdot p^3 \equiv 2 \cdot \tilde{\omega}_1 \cdot \tilde{\omega}_2 \cdot p^3 + 2 \cdot \tilde{\omega}_0 \cdot \omega_3 \cdot p^3 \pmod{p^5},$$

whence $\tilde{\omega}_3 = 97$.
Finally, from the fifth of (57), let $$0 \cdot p^4 \equiv \tilde{\omega}_2^2 \cdot p^4 + 2 \cdot \tilde{\omega}_1 \cdot \tilde{\omega}_3 \cdot p^4 + 2 \cdot \tilde{\omega}_0 \cdot \omega_4 \cdot p^4 \pmod{p^5},$$

whence $\tilde{\omega}_4 = 12$. Then $$N \equiv (181{,}200 + 18{,}120 \cdot p + 1{,}814 \cdot p^2 + 97 \cdot p^3 + 12 \cdot p^4)^2 \pmod{p^5}. \quad (59)$$

Proceeding in a similar fashion with $\overline{\omega}_0 = 190{,}093$, it is $$N \equiv (190{,}093 + 10{,}441 \cdot p + 383 \cdot p^2 + 72 \cdot p^3 + 1 \cdot p^4)^2 \pmod{p^5}. \quad (60)$$

Comparison of the resulting $\tilde{\omega}_i$ with the corresponding $\overline{\omega}_i$ yields $$\begin{cases} \tilde{\omega}_i + \overline{\omega}_i = p^{5-i} \\ 0 < \tilde{\omega}_i < p^{6-i} \end{cases} \quad (61)$$

or $$(\tilde{\omega}_i + \overline{\omega}_i) \cdot p^i = p^5. \quad (62)$$

Thus, in the example, $$181{,}200 + 190{,}093 = p^5$$

$$18{,}120 + 10{,}441 = p^4$$

$$1{,}814 + 383 = p^3$$

$$97 + 72 = p^2$$

$$12 + 1 = p \quad (63)$$

and $$\tilde{A} + \overline{A} = 5 \cdot p^5. \quad (64)$$

Notice that, when $\tilde{A}$ and $\overline{A}$ are subject to the constraint (49), as in (53) and (54), their sum equals $p^5$.
Comparing the representations of $\tilde{A}$ by (59) and (53), it can be stated that the representation proposed by (59) entails an equipartition of weight among the 5 degrees of freedom of (55).
NOTE 1: In the example, each coefficient $\tilde{\omega}_i$ of $\tilde{A}$ is computed modulo $p^{5-i}$. If the magnitude constraint (49) were to be applied to the coefficients on the RHS of (59) and (60), the coefficients $\omega_i$ would be reduced modulo p and the structure (57) would be demolished.

In practice, the integer N, as represented on the RHS of (59) and (60), should be treated as a polynomial in some integer variable u, say P(u), where P(u) happens to be computed at u=p.

NOTE 2: In (55) the representation of the coefficients to, is arbitrary. In (59) and (60) such coefficients are represented in base 10. They may be represented in any other base, such as p.

NOTE 3: It should be noted that in (51) $p^4 < N < p^5$ and in (55) A is being defined modulo $p^5$. In general, such may not be the case. It is possible that A be defined modulo a larger power of p, depending on the requirements of the problem on hand. A similar situation occurs in the domain of irrational numbers, such as $\sqrt{2}$. $\sqrt{2}$ may be computed with a large number of decimal digits, depending on the precision required by the problem on hand. No harm is done if the precision of the computed value of $\sqrt{2}$ is greater than needed.

As an example, consider the case when p=13 and $N_1 < p^2$. Assume that $N_1 = v_0 + v_1 \cdot p = 10 + 2 \cdot p$. It is desired to solve $$N_1 \equiv A^2 \pmod{p^5}. \quad (65)$$

In this case the integers $\omega_i$ are defined by the following:

$$\begin{cases} v_0 \equiv \omega_0^2 \pmod{p^5} \\ v_1 \cdot p \equiv 2 \cdot \omega_0 \cdot \omega_1 \cdot p \pmod{p^5} \\ 0 \equiv \omega_1^2 \cdot p^2 + 2 \cdot \omega_0 \cdot \omega_2 \cdot p^2 \pmod{p^5} \\ 0 \equiv 2 \cdot \omega_1 \cdot \omega_2 \cdot p^3 + 2 \cdot \omega_0 \cdot \omega_3 \cdot p^3 \pmod{p^5} \\ 0 \equiv 2 \cdot \omega_1 \cdot \omega_3 \cdot p^4 + 2 \cdot \omega_0 \cdot \omega_4 \cdot p^4 + \omega_2^2 \cdot p^4 \pmod{p^5} \end{cases} \quad (66)$$

For $\omega_0 \equiv 6 \pmod{p}$, the result is $$N_1 10 + 2 \cdot p \equiv (181{,}200 + 18{,}120 \cdot p + 1{,}291 \cdot p^2 + 23 \cdot p^3 + 2 \cdot p^4)^2 \pmod{p^5}. \quad (67)$$

Compare with (59).

NOTE 4: As a further application of this method of representation of integers, consider the problem of computing $\tilde{A}^{-1} \pmod{p^5}$ when $\tilde{A}$ is defined as in (55). Let $$\tilde{A}^{-1} \equiv w_0 + w_1 \cdot p + w_2 \cdot p^2 + w_3 \cdot p^3 + w_4 \cdot p^4 \pmod{p} \quad (68)$$

and $$\tilde{A} \cdot \tilde{A}^{-1} \equiv 1 \pmod{p^5}. \quad (69)$$

The coefficients $w_i$ should be defined as the least positive solutions of the following:

$$\begin{cases} \tilde{\omega}_0 \cdot w_0 \equiv 1 \pmod{p^5} \\ \tilde{\omega}_0 \cdot w_1 + \tilde{\omega}_1 \cdot \tilde{w}_0 \equiv 0 \pmod{p^4} \\ \tilde{\omega}_0 \cdot w_2 + \tilde{\omega}_1 \cdot \tilde{w}_1 + \tilde{\omega}_2 \cdot \tilde{w}_0 \equiv 0 \pmod{p^3} \\ \tilde{\omega}_0 \cdot w_3 + \tilde{\omega}_1 \cdot \tilde{w}_2 + \tilde{\omega}_2 \cdot \tilde{w}_1 + \tilde{\omega}_3 \cdot \tilde{w}_0 \equiv 0 \pmod{p^2} \\ \tilde{\omega}_0 \cdot w_4 + \tilde{\omega}_1 \cdot \tilde{w}_3 + \tilde{\omega}_2 \cdot \tilde{w}_2 + \tilde{\omega}_3 \cdot \tilde{w}_1 + \tilde{\omega}_4 \cdot \tilde{w}_0 \equiv 0 \pmod{p} \end{cases} \quad (70)$$

In the example, $\tilde{A}^{-1} \equiv 18{,}120 + 26{,}749 \cdot p + 1{,}590 \cdot p^2 + 73 \cdot p^3 + 9 \cdot p^4 \pmod{p^5}$.

The product $\tilde{A} \cdot \tilde{A}^{-1}$ also contains the following terms:

$$\begin{cases} (\omega_1 \cdot w_4 + \omega_2 \cdot w_3 + \omega_3 \cdot w_2 + \omega_4 \cdot w_1) \cdot p^5 = 347,391 \cdot p^5 \\ (\tilde{\omega}_2 \cdot \tilde{w}_4 + \tilde{\omega}_3 \cdot \tilde{w}_3 + \tilde{\omega}_4 \cdot \tilde{w}_2) \cdot p^6 = 15,478 \cdot p^6 \\ (\tilde{\omega}_3 \cdot \tilde{w}_4 + \tilde{\omega}_4 \cdot \tilde{w}_3) \cdot p^7 = 353 \cdot p^7 \\ \tilde{\omega}_4 \cdot \tilde{w}_4 \cdot p^8 = 18 \cdot p^8 \end{cases} \quad (71)$$

VIII. THE ROADMAP.

1) Introduction. Definition of M.

Given p and N, select $\tilde{A}$ as one of the solutions of (47) modulo $p^n$, computed using the procedure described in Section VII. Assume $\tilde{A} > p^n$ (64).

Then, using (35), let $$N \equiv \tilde{A}^2 - U^2 \cdot p^2 - 2 \cdot \tilde{A} \cdot V \cdot p^2 + V^2 \cdot p^4, \quad (72)$$

where $$\begin{cases} \tilde{A} = \sum_{i=0}^{n-1} \tilde{\omega}_i \cdot p^i \\ U = \sum_{i=1}^{n-1} u_i \cdot p^{i-1} \\ V = \sum_{i=2}^{n-1} v_i \cdot p^{i-2} \end{cases} \quad (73)$$

Referring to (59), recall that each $\omega_i$ can be represented as $$\omega_i = \sum_{k=0}^{n-1-i} \omega_{i,k} \cdot p^k. \quad (74)$$

Also, $$\begin{cases} u_i = \sum_{k=1}^{n-1-i} u_{i,k} \cdot p^{k-1} \\ v_i = \sum_{k=1}^{n-1-i} v_{i,k} \cdot p^{k-2} \end{cases} \quad (75)$$

and $$\begin{cases} U_{i,j} = \sum_{k=1}^{j} u_{i,k} \cdot p^{k-1} \\ V_{i,j} = \sum_{k=1}^{j} v_{i,k} \cdot p^{k-2} \end{cases} \quad (76)$$

Then $$\begin{cases} r \equiv \tilde{A} + u_1 \cdot p + (-v_2 + u_2) \cdot p^2 + (-v_3 + u_3) \cdot p^3 + \ldots + \\ \quad (-v_{n-1} + u_{n-1}) \cdot p^{n-1} (\bmod \ p^n) \\ s \equiv \tilde{A} - u_1 \cdot p + (-v_2 - u_2) \cdot p^2 + (-v_3 - u_3) \cdot p^3 + \ldots + \\ \quad (-v_{n-1} - u_{n-1}) \cdot p^{n-1} (\bmod \ p^n) \end{cases} \quad (77)$$

The representation (77) of r and s accounts for the fact that both r and s are smaller than $p^n$. However, using (77), the product of r by s contains powers of p greater than $p^n$, actually as high as $p^{2 \cdot n - 2}$.

In order to uncover the properties which relate the coefficients of (77), it is necessary to compute, and represent without loss of information, the multiples of any $p^i$ which results from the multiplication of r by s. To this end a new modulus is introduced, namely $p^M$, where $$\boxed{M = (2 \cdot n - 2) + 1}. \quad (78)$$

It should be noticed that:
1) M is always odd.
2) If $n = 2 \cdot \tilde{k} + 1$, then $M = 4 \cdot \tilde{k} + 1$.
3) The use of M does not affect the magnitude of N. If $N < p^n$, it can be represented as follows:

$$\begin{cases} N = \sum_{i=0}^{n-1} v_i \cdot p^i \\ v_i = 0 \text{ for } n - 1 < i \le M - 1 \end{cases} \quad (79)$$

4) When M is employed in lieu of n, $\tilde{A}$ should be computed as a solution of the following:

$$N \equiv A^2 \ (\bmod \ p^M). \quad (80)$$

5) $s = s_0$ and $r > s_0$.
6) A comparable result is achieved when $\tilde{T}_0$ is employed in lieu of $\tilde{\tau}$.

2) The Approach

In the case where (79) is employed, reduction of (77) modulo $p^3$ yields $$\frac{N - \tilde{A}^2}{p^M} \cdot p^M \equiv \left(-u_1^2 - 2 \cdot \tilde{A} \cdot v_2\right) \cdot p^2 (\bmod \ p^3). \quad (81)$$

Then, if the pair $(\tilde{u}_1, \tilde{v}_2)$ is a solution of (81) modulo p, it is $$\frac{N - \tilde{A}^2}{p^M} \cdot p^M + \left(\frac{\tilde{u}_1^2 + 2 \cdot \tilde{A} \cdot \tilde{v}_2}{p} \cdot p\right) \cdot p^2 \equiv \\ \left(-2 \cdot \tilde{u}_1 \cdot u_2 - 2 \cdot \tilde{A} \cdot v_3\right) \cdot p^3 (\bmod \ p^4). \quad (82)$$

The LHS of this congruence contains a contribution to the set of multiples of $p^3$. This contribution is usually denoted as a "carry". The flow of carries from one digit to the higher powers of p increases the complexity of the factorization problem. The flow of carries would be controlled better if (81) were solved modulo $p^M$ and the pair $(u_1^2, v_2)$ were defined modulo $p^{M-2}$. In this case (82) could take the following form:

$$\frac{N-\tilde{A}^2}{p^M}\cdot p^M + \left(\frac{\tilde{u}_1^2 + 2\cdot\tilde{A}\cdot\tilde{v}_2}{p^{M-2}}\cdot p^{M-2}\right)\cdot p^2 \equiv \tag{83}$$
$$(-2\cdot\tilde{u}_1\cdot u_2 - 2\cdot\tilde{A}\cdot v_3)\cdot p^3 \pmod{p^4}.$$

This approach would require replacing the magnitude constraints (49) from the elements of $\{u_i\}$ and $\{v_i\}$ and assuring that the RHS of congruences such as (83) include all the terms which are multiples of any given $p^i$. Following this procedure, still there would be carries, as shown on the LHS of (83). However, such carries would flow from any given congruence directly into a pool of multiples of $p^M$.

The plan of this presentation consists of analyzing each of the terms of (72) with the appropriate definition of $\tilde{A}$ and resolving them into the sum of powers of p. Then, for any given power of p, say $p^i$, add all the coefficients of $p^i$ which are produced by $\tilde{A}^2 - N$, $-2\cdot\tilde{A}\cdot(\tilde{A}-Y)$, $(\tilde{A}-Y)^2$ and $-X^2$ and place the condition that their sum be congruent to zero modulo $p^{M-i}$.

3) The Integer $\tilde{A}^2 - N$

Let $\tilde{A}$ be defined as in (73), where the integers $\tilde{\omega}_i$ are determined using the procedure illustrated in Section VII. Thus, for $i<M$, $$\begin{cases} v_0 \equiv \tilde{\omega}_0^2 \pmod{p^M} \\ v_1 \equiv 2\cdot\tilde{\omega}_0\cdot\tilde{\omega}_1 \pmod{p^{M-1}} \\ v_2 \equiv \tilde{\omega}_1^2 + 2\cdot\tilde{\omega}_0\cdot\tilde{\omega}_2 \pmod{p^{M-2}} \\ \cdots \\ v_{M-1} \equiv \sum_{k=1}^{M-2}\tilde{\omega}_k\cdot\tilde{\omega}_{M-1-k} + 2\cdot\tilde{\omega}_0\cdot\tilde{\omega}_{M-1} \pmod{p} \end{cases} \tag{84}$$

where $$\begin{cases} \omega_0 \equiv \pm\tilde{\tau}\cdot\tilde{\alpha} \pmod{p} \\ \omega_0 + \omega_1\cdot p \equiv \pm\tilde{\tau}\cdot\tilde{\alpha} \pmod{p^2} \end{cases} \tag{85}$$

In fact, $N \equiv \tilde{\tau}^2\cdot\tilde{\alpha}^2 \pmod{p^2}$ and also $N \equiv (\omega_0+\omega_1\cdot p)^2 \pmod{p^2}$.

Consider then the integer $\tilde{A}^2 - N$. As an illustration, refer to FIG. 1. The headings of the rows and columns represent the coefficients $\tilde{\omega}_i$ of $\tilde{A}$. Multiplication of $\tilde{A}$ by $\tilde{A}$ generates the products $\tilde{\omega}_i\cdot\tilde{\omega}_j$ which are represented by the cells of FIG. 1. Cells on any given line of slope 1 contribute to the coefficient of the same power of p.

Let $LH_i$ and $RH_i$ denote the LHS and the RHS, respectively, of the congruence containing $v_i$. For $i<M$ each $(LH_i - RH_i)$, multiplied by the corresponding $p^i$, contributes to the resulting polynomial a known multiple of $p^M$. In fact, $$\left(\frac{LH_i - RH_i}{p^{M-i}}\cdot p^{M-i}\right)\cdot p^i \equiv 0 \pmod{p^M}. \tag{86}$$

For $i>M$, $\tilde{A}^2$ contains terms of degree greater than $p^M$. The highest power of p in $\tilde{A}^2 - N$ is $p^{2\cdot M-2}$. In fact, the highest power of p in $\tilde{A}$ is $p^{M-1}$. After squaring, the highest power in this representation of $\tilde{A}^2$ is $p^{2\cdot M-2}$.

Therefore, for $i=M+j$, and $j\geq 0$, $\tilde{A}^2 - N$ contains multiples of $p^{M+j}$, say $p^{M+j}\cdot Q_j$, where $$Q_j = \sum_{k=1}^{M-j-1}\tilde{\omega}_{M-k}\cdot\tilde{\omega}_{k+j}. \tag{87}$$

The total contribution, for all $j\geq 0$, is $$p^M\cdot Q \equiv p^M\cdot\sum_{i=0}^{M-2}p^j\cdot Q_j. \tag{88}$$

As a conclusion:
1) For $i<M$, by (84), $$(v_i - RH_i)\cdot p^i \equiv 0 \pmod{p^m}. \tag{89}$$

2) For $i=M$ each of the terms on the corresponding line of slope 1 is a coefficient of $p^M$.
3) For $i>M$ each of the terms on the corresponding line of slope 1 is a coefficient of $p^M\cdot p^j$, where $0<j=i-M$. Refer to FIG. 1.

In particular, in the example (59), it is $$\begin{cases} (2\cdot\omega_1\cdot\omega_4 + 2\cdot\omega_2\cdot\omega_3)\cdot p^5 = 786796\cdot p^5 \\ (2\cdot\omega_2\cdot\omega_4 + \omega_3^2)\cdot p^6 = 52945\cdot p^6 \\ (2\cdot\omega_3\cdot\omega_4)\cdot p^7 = 2328\cdot p^7 \\ \omega_4^2\cdot p^8 = 144\cdot p^8 \end{cases} \tag{90}$$

4) The Relationship Between $v_i$ and $u_{i-1}$ when $u_1 \not\equiv 0 \pmod{p}$ Consider the representation of the pair $(r, s)$ as in (77), where $\tilde{A}$ is constructed as described in Section VII, and M is used in lieu of n. Thus, when r is multiplied by s, it is possible to group all the terms which contain any multiple of any given power of p, say $p^i$, and place the condition that the sum of their coefficients be congruent to zero modulo $p^{M-i}$.

However, by (84), resolving the integer $\tilde{A}^2 - N$ into its components, the sum of the coefficients of $p^i$ in $(\tilde{A}^2 - N)$ equals $$\sum_{k=0}^{i}\tilde{\omega}_k\cdot\tilde{\omega}_{i-k} - v_i \equiv 0 \pmod{p^{M-i}}. \tag{91}$$
$$= \tilde{\eta}_i\cdot p^{M-i}$$

($\eta_i$ an integer).

As a result, consider the case when it is desired to express $v_6$ as a function of all the $u_l$'s $1\leq l\leq 5'$, and the $v_j$'s ($2\leq j\leq 5$). It will be $$-(2\cdot\tilde{\omega}_0\cdot v_6 + 2\cdot\tilde{\omega}_1\cdot v_5 + 2\cdot\tilde{\omega}_2\cdot v_4 + 2\cdot\tilde{\omega}_3\cdot v_3 + 2\cdot\tilde{\omega}_4\cdot v_2) +$$
$$2\cdot v_2\cdot v_4 + v_3^2 \equiv 2\cdot u_1\cdot u_5 + 2\cdot u_2\cdot u_4 + u_3^2 \pmod{p^{M-6}}. \tag{92}$$

This congruence defines $v_6$ modulo $p^{M-6}$ as a function of lesser degree variables. If $u_1 \not\equiv 0 \pmod{p}$ and if all the variables of lesser degree are known, (92) defines a linear congruence between $v_6$ and $u_5$ modulo $p^{M-6}$. After the determination of $v_6$, upon multiplication by $p^6$, it will be $$\left(\frac{LH_6 - RH_6}{p^{M-6}}\cdot p^{M-6}\right)\cdot p^6 \equiv 0 \pmod{p^M} \tag{93}$$

where $LH_6$ and $RH_6$ denote the LHS and RHS of (92), respectively. The LHS of this latter congruence is a multiple of $p^M$ and does not contain any power of p greater than $p^M$.

In general, for $2 \leq i \leq M-1$, $$\begin{cases} u_1 \not\equiv 0 \pmod{p} \\ 2 \leq i \leq M-1 \\ -2 \cdot \sum_{k=2}^{i} \tilde{\omega}_{t-k} \cdot v_k + \sum_{k=2}^{i-2} v_k \cdot v_{i-k} \equiv \sum_{k=1}^{i-1} u_k \cdot u_{i-k} \pmod{p^{M-i}} \end{cases} \quad (94)$$

The first summation on the LHS of (94) contains terms which result from the multiplication of $-2 \cdot \tilde{A}$ by $(\tilde{A}-Y)$, when $\tilde{A}$ is represented as described in Section VII. The second summation on the LHS results from $(\tilde{A}-Y)^2$.

5) The Product $2 \cdot \tilde{A} \cdot (\tilde{A}-Y)$

FIG. 2 illustrates the product $\tilde{A} \cdot (\tilde{A}-Y)$. The columns are headed by the coefficients $v_i$ of $p^i$ in Y. The rows are headed by the coefficients $\tilde{\omega}_j$ of $p^j$ in $\tilde{A}$.

Some of the cells represent products $\tilde{\omega}_j \cdot v_i$ which have been included in (94). Refer to (92) as an example. As a further example, the cells on the line of slope 1 which contains $\tilde{\omega}_0 \cdot v_{M-1}$ and $\tilde{\omega}_{M-3} \cdot v_2$ represent coefficients of $p^{M-1}$ which are employed to write (94) modulo p.

The cells on the line of slope 1 which contains $\tilde{\omega}_{M-1} \cdot v_2$ represent coefficients of $p^{M+1}$ and are not included in (94).

The highest power of p contained in $2 \cdot \tilde{A} \cdot (\tilde{A}-Y)$ is $p^{2 \cdot M-2}$, obtained through the product of $\tilde{\omega}_{M-1} \cdot p^{M-1}$ by $v_{M-1} \cdot p^{M-1}$.

6) The Integer $(\tilde{A}-Y)^2$

FIG. 3 illustrates $(\tilde{A}-Y)^2$. Rows and columns are headed by the coefficients $v_i$ of $p^i$ in Y. Some of the cells represent products of $v_i \cdot v_j$ which have been included in (94). Refer to (92) as an example.

Since the largest power of p in Y is $p^{M-1}$, (94) must also be written for $i=M-1$. Then the LHS of (94) must include cells representing the products $v_2 \cdot v_{M-3}$, $v_3 \cdot v_{M-4}$, etc. Cells representing coefficients of higher powers of p are not absorbed into (94) and contribute to $\Sigma_0$, when $\Sigma_0$ denotes the sum of all the products $v_i \cdot v_j \cdot p^i \cdot p^j$ which have not been absorbed as terms of any of the congruences (94). It will be $$\Sigma_0 = p^M \cdot \left( v_2 \cdot v_{M-2} + v_3 \cdot v_{M-3} + \ldots + v_{\frac{M-1}{2}} \cdot v_{\frac{M+1}{2}} \right) + \quad (95)$$
$$p^{M+1} \cdot (v_2 \cdot v_{M-1} + v_3 \cdot v_{M-2} + \ldots + v_{M-1} \cdot v_2) +$$
$$p^{M+2} \cdot (v_3 \cdot v_{M-1} + v_4 \cdot v_{M-2} + \ldots + v_{M-1} \cdot v_3) \ldots +$$
$$p^2 \cdot p^{M-6} \cdot (v_{M-1} \cdot v_{M-5} + v_{M-2} \cdot v_{M-4} + \ldots + v_{M-1} \cdot v_{M-5}) +$$
$$p^2 \cdot p^{M-5} \cdot (v_{M-1} \cdot v_{M-4} + v_{M-2} \cdot v_{M-3} + \ldots + v_{M-4} \cdot v_{M-1}) \ldots +$$
$$p^{2 \cdot M-2} \cdot v_{M-1}^2.$$

7) The Integer $X^2$

FIG. 4 illustrates $X^2$. Rows and columns are headed by the coefficients $u_i$ of $p^i$ in X. Some of the cells represent products $u^i \cdot u^j$ which have been included in (94). Refer to (92) as an example.

Since the largest power of p in X is $p^{M-1}$, (94) must also be written for $i=M-1$. Then the RHS of (94) must include cells representing the products $u_2 \cdot u_{M-3}$, $u_3 \cdot u_{M-4}$, etc. The cells on the line of slope one which contains $u_1 \cdot u_{M-1}$ represents multiples of $p^M$. The cells on the line of slope one which contains $u_2 \cdot u_{M-1}$ represents multiples of $p^{M+1}$. In general, let $\Xi_0$ denote the sum of the products $u_i \cdot u_j \cdot p^i \cdot p^j$ which have not be absorbed as terms of any of the (94). It will be $$\Xi_0 = p^M \cdot \left( u_1 \cdot u_{M-1} + u_2 \cdot u_{M-2} + \ldots + u_{\frac{M-1}{2}} \cdot u_{\frac{M+1}{2}} \right) + \quad (96)$$
$$p^{M+1} \cdot (u_2 \cdot u_{M-1} + u_3 \cdot u_{M-2} + \ldots + u_{M-1} \cdot u_2) +$$
$$p^{M+2} \cdot (u_3 \cdot u_{M-1} + u_4 \cdot u_{M-2} + \ldots + u_{M-1} \cdot u_3) \ldots +$$
$$p^{2 \cdot M-3} \cdot 2 \cdot u_{M-2} \cdot u_{M-1} + p^{2 \cdot M-2} \cdot u_{M-1}^2.$$

Consider the case when $u_{M-1}=0$ and $u_{M-2} \neq 0$. In this case $u_2 \cdot u_{M-1}=0$. Then the line of slope one containing multiples of $p^{M+1}$ does not contain any cell which has a coefficient of $p^{M+1}$ dependent on $u_2$. Refer to FIG. 4. If $u_{M-2} \neq 0$, the sum of the coefficients of $p^{M+1}$ includes a term dependent on $u_3$.

IX. THE RELATIONSHIP BETWEEN $v_i$ AND $u_i$ of WHEN $u_{M-1} \neq 0$

1) The Approach

Consider the general expression of (r, s) (77). Multiply r by s modulo $p^M$. Using (94), it will be $$\left( \frac{LH_i - RH_i}{p^{M-i}} \cdot p^{M-i} \right) \cdot p^i \equiv 0 \pmod{p^M}, \quad (97)$$

where the $LH_i$ and $RH_i$ denote the LHS and RHS of (94), respectively.

Therefore, $$0 = \frac{\tilde{A}^2 - N}{p^M} \cdot p^M + \text{multiples of } p^M \text{ produced by (97)} - \quad (98)$$
$$\text{multiples of } p^M \text{ produced by } 2 \cdot \tilde{A} \cdot (\tilde{A}-Y) + \Sigma_0 - \Xi_0.$$

Recall that, when using (94), for $i \leq M-1$, the multiples of $p^M$ produced by (97) do not contain any power of p greater than $p^M$. Thus, their presence on the RHS of (98) does not interfere with the process of analyzing the coefficients of higher powers of p.

A relationship between $v_i$ and $u_i$ can be produced by placing the condition that the carriers flow from any power of p greater than $p^M$, say $p^{M+j}(j \geq 1)$, to higher powers of p, say $p^{M+j+1}$. This condition implies that the sum of the coefficients of any power of p greater than $p^M$ equal zero modulo $p^j$ and no carry flows into $p^{2 \cdot (M-1)+1}$.

Starting from the highest power of p, observe that in (95) the highest power of p is $p^{2 \cdot M-2}$. In fact, $Y<p^M$ and the highest power of p in Y is $p^{M-1}$. After squaring, the highest power is $p^{2 \cdot M-2}$. A similar situation occurs for $\tilde{A}^2-N$, where $$Q_{M-2}=\tilde{\omega}_{M-1}^2. \quad (99)$$

Concerning the product $-2 \cdot \tilde{A} \cdot v_{M-1}$, the highest power of p it contains is $p^{2 \cdot M-2}$, with a coefficient of $-2 \cdot \tilde{\omega}_{M-1} \cdot v_{M-1}$. Then $$0 = p^M \cdot (Q_{M-2} \cdot p^{M-2}) - 2 \cdot \tilde{\omega}_{M-1} \cdot v_{M-1} \cdot p^{2 \cdot M-2} + \quad (100)$$
$$(v_{M-1} \cdot p^{M-1})^2 - (u_{M-1} \cdot p^{M-1})^2.$$

As a result, $$(\tilde{\omega}_{M-1} - v_{M-1})^2 = u_{M-1}^2, \quad (101)$$

or $$(\tilde{\omega}_{M-1} - v_{M-1} - u_{M-1}) \cdot (\tilde{\omega}_{M-1} - v_{M-1} + u_{M-1}) = 0. \quad (102)$$

2) The Case when $\tilde{\omega}_{M-1} - v_{M-1} = u_{M-1}$

Consider (98) in the case when $u_{M-1} > 0$ and $\tilde{\omega}_{M-1} - v_{M-1} = u_{M-1}$. The second highest power of p in $\Sigma_0$ is $p^{2 \cdot M-3}$. The same is true in $\tilde{A}^2 - N$. In $-2 \cdot \tilde{A} \cdot (\tilde{A} - Y)$ the coefficient of $p^{2 \cdot M-3}$ is $-2 \cdot \tilde{\omega}_{M-2} \cdot v_{M-1} \cdot u_{M-1} - 2 \cdot \tilde{\omega}_{M-1} \cdot v_{M-2}$. Therefore, $$0 = 2 \cdot \tilde{\omega}_{M-1} \cdot \tilde{\omega}_{M-2} - 2 \cdot \tilde{\omega}_{M-1} \cdot v_{M-2} - 2 \cdot \tilde{\omega}_{M-2} \cdot v_{M-1} + 2 \cdot v_{M-1} \cdot v_{M-2} - 2 \cdot u_{M-1} \cdot u_{M-2} \quad (103)$$

or $$2 \cdot (\tilde{\omega}_{M-1} - v_{M-1}) \cdot (\tilde{\omega}_{M-2} - v_{M-2}) = 2 u_{M-1} \cdot u_{M-2}. \quad (104)$$

By (102), if $u_{M-1} \neq 0$ and $\tilde{\omega}_{M-1} - v_{M-1} = u_{M-1}$, it must be $$\tilde{\omega}_{M-2} - v_{M-2} = u_{M-2}. \quad (105)$$

At the next iteration, the contributions to (98) are the following multiples of $p^{2 \cdot M-4}$:

$$\begin{cases} 2 \cdot v_{M-3} \cdot v_{M-1} + v_{M-2}^2 & \text{from } (\tilde{A} - Y)^2 \\ -2 \cdot \tilde{\omega}_{M-3} \cdot v_{M-1} - 2 \cdot \tilde{\omega}_{M-2} \cdot v_{M-2} - \\ 2 \cdot \tilde{\omega}_{M-1} \cdot v_{M-3} & \text{from } -2 \cdot \tilde{A} \cdot (\tilde{A} - Y) \\ 2 \cdot \tilde{\omega}_{M-3} \cdot \tilde{\omega}_{M-1} + \tilde{\omega}_{M-2}^2 & \text{from } \tilde{A}^2 - N \\ -2 \cdot u_{M-1} \cdot u_{M-3} - u_{M-2}^2 & \text{from } -X^2 \end{cases} \quad (106)$$

Therefore, $$2 \cdot (\tilde{\omega}_{M-1} - v_{M-1}) \cdot (\tilde{\omega}_{M-3} - v_{M-3}) + (\tilde{\omega}_{M-2} - v_{M-2})^2 = 2 \cdot u_{M-1} \cdot u_{M-3} + u_{M-2}^2. \quad (107)$$

By (102) and (105), $$\tilde{\omega}_{M-3} - v_{M-3} = u_{M-3}. \quad (108)$$

At every iteration the sequence produces a similar relationship between $v_i$ and $u_i$. The sequence ends after it concludes that $$\tilde{\omega}_2 - v_2 = u_2. \quad (109)$$

In general $$\boxed{\tilde{\omega}_i - v_i = u_i.} \quad (110)$$

These conclusions were reached without interference from (97), which contains multiples of $p^M$ only. Indeed, the last equation in the sequence, the one which produced (109), is an equation which operates on multiples of $p^{M+1}$. Refer to (94) and the illustration in FIG. 3.

Consider the representation of the pair (r, s) as in (77). Substitution of (110) into (77) yields $$\begin{cases} r = \tilde{A} + u_1 \cdot p + (2 \cdot u_2 - \tilde{\omega}_2) \cdot p^2 + (2 \cdot u_3 - \tilde{\omega}_3) \cdot p^3 + \ldots + (2 \cdot u_{M-1} - \tilde{\omega}_{M-1}) \cdot p^{M-1} \\ s = \tilde{A} - u_1 \cdot p - \tilde{\omega}_2 \cdot p^2 - \tilde{\omega}_3 \cdot p^3 - \ldots - \tilde{\omega}_{M-1} \cdot p^{M-1} \end{cases} \quad (111)$$

or $$\begin{cases} r = \tilde{A} + u_1 \cdot p + (-2 \cdot v_2 + \tilde{\omega}_2) \cdot p^2 + (-2 \cdot v_3 + \tilde{\omega}_3) \cdot p^3 + \ldots + (-2 \cdot v_{M-1} + \tilde{\omega}_{M-1}) \cdot p^{M-1} \\ s = \tilde{A} - u_1 \cdot p - \tilde{\omega}_2 \cdot p^2 - \tilde{\omega}_3 \cdot p^3 - \ldots - \tilde{\omega}_{M-1} \cdot p^{M-1} \end{cases} \quad (112)$$

3) The Case when $\tilde{\omega}_{M-1} - v_{M-1} = -u_{M-1}$

Consider (98) in the case when $u_{M-1} > 0$ and $\tilde{\omega}_{M-1} - v_{M-1} = -u_{M-1}$. In this case (104) yields $$\tilde{\omega}_{M-2} - v_{M-2} = -u_{M-2}. \quad (113)$$

Likewise, (107) yields $$\tilde{\omega}_{M-3} - v_{M-3} = -u_{M-3}. \quad (114)$$

and, in general, $$\tilde{\omega}_i - v_i = -u_i. \quad (115)$$

In this case, substitution of (115) into (77) yields $$\begin{cases} r = \tilde{A} + u_1 \cdot p - \tilde{\omega}_2 \cdot p^2 - \tilde{\omega}_3 \cdot p^3 - \ldots - \tilde{\omega}_{M-1} \cdot p^{M-1} \\ s = \tilde{A} - u_1 \cdot p - (2 \cdot u_2 + \tilde{\omega}_2) \cdot p^2 - (2 \cdot u_3 + \tilde{\omega}_3) \cdot p^3 - \ldots - (2 \cdot u_{M-1} + \tilde{\omega}_{M-1}) \cdot p^{M-1} \end{cases} \quad (116)$$

or $$\begin{cases} r = \tilde{A} + u_1 \cdot p - \tilde{\omega}_2 \cdot p^2 - \tilde{\omega}_3 \cdot p^3 - \ldots - \tilde{\omega}_{M-1} \cdot p^{M-1} \\ s = \tilde{A} - u_1 \cdot p + (-2 \cdot v_2 + \tilde{\omega}_2) \cdot p^2 + (-2 \cdot v_3 + \tilde{\omega}_3) \cdot p^3 + \ldots + (-2 \cdot v_{M-1} + \tilde{\omega}_{M-1}) \cdot p^{M-1} \end{cases} \quad (117)$$

NOTE 1: There are two sets of conditions which can assist in the solution of the factorization problem. The first set are the congruences (94). If $u_1 \neq 0 \pmod{p}$, for $2 < i < M$ they establish linear relationships between $v_i$ and $u_{i-1}$ modulo $p^{M-1}$ when the variables $v_j$ and $u_j$ of lesser degree are known. Refer to the example in (92).
The second set are the equations (110) or (115).
Substitution of (110) into (77) produced (111) and (112).
Substitution of (115) into (77) produced (116) and (117).
NOTE 2: Using (111) or (112) to compute (r+s)/2 and (r−s)/2 produce the same results as (77). The benefit of (111) and (112) lies in the fact that, when r is multiplied by s modulo $p^M$, the product does not contain any power of p higher than $p^M$. Also, except for $u_1$, with $u_1 \neq 0 \pmod{p}$, (112) and (111) are linear functions which contain only the set $\{v_i\}$ or $\{u_i\}$, respectively. Similar considerations apply to (116) and (117).

4) The Case when $u_{M-1} = 0$

Consider the case when $u_{M-1} = 0$. In this case, equation (102) becomes $$\tilde{\omega}_{M-1} - v_{M-1} = 0. \quad (118)$$

Therefore, no information can be produced using (104). However, (107) yields $$\tilde{\omega}_{M-2} - v_{M-2} = \pm u_{M-2}. \quad (119)$$

If $u_{M-2} \neq 0$, the process can be continued until it concludes that $$\tilde{\omega}_3 - v_3 = u_3. \quad (120)$$

or $$\tilde{\omega}_3 - v_3 = -u_3. \quad (121)$$

In fact, if $u_{M-1} = 0$, $u_3 \cdot p^3$ is the lowest degree element which, when multiplied by $u_{M-2} \cdot p^{M-2}$, produces a multiple of $p^{M+1}$. Again, there is the possibility that $u_{M-2}$ be zero. In this case (110) or (115) are applicable only when i equals or exceeds 4. The situation is it illustrated by Section VIII.7 and FIG. 4.

In general, assume that $u_1 \neq 0$ modulo p and $u_{M-j}=0$ for $1 \leq j \leq j_0$. Then (110) is applicable only for $i \geq j_0+2$. In these cases the general expression of the pair (r, s) is $$\begin{cases} r = \tilde{A} + u_1 \cdot p + \sum_{i=2}^{j_0+1}(-v_i + u_i) \cdot p^i + \sum_{i=j_0+2}^{M-j_0-1}(2 \cdot u_i - \tilde{\omega}_i) \cdot \\ \qquad p^i - \sum_{i=M-j_0}^{M-1} \tilde{\omega}_i \cdot p^i \\ s = \tilde{A} - u_1 \cdot p + \sum_{i=2}^{j_0+1}(-v_i - u_i) \cdot p^i - \sum_{i=j_0+2}^{M-j_0-1} \tilde{\omega}_i \cdot p^i - \\ \qquad \sum_{i=M-j_0}^{M-1} \tilde{\omega}_i \cdot p^i \end{cases} \quad (122)$$

Compare with (111). Also, in this case, (112) becomes $$\begin{cases} r = \tilde{A} + u_1 \cdot p + \sum_{i=2}^{j_0+1}(-v_i + u_i) \cdot p^i + \sum_{i=j_0+2}^{M-j_0-1}(-2 \cdot v_i + \tilde{\omega}_i) \cdot \\ \qquad p^i - \sum_{i=M-j_0}^{M-1} \tilde{\omega}_i \cdot p^i \\ s = \tilde{A} - u_1 \cdot p + \sum_{i=2}^{j_0+1}(-v_i - u_i) \cdot p^i - \sum_{i=j_0+2}^{M-j_0-1} \tilde{\omega}_i \cdot p^i - \\ \qquad \sum_{i=M-j_0}^{M-1} \tilde{\omega}_i \cdot p^i \end{cases} \quad (123)$$

Similarly, if (93) is used in lieu of (110), (116) is replaced by $$\begin{cases} r = \tilde{A} + u_1 \cdot p + \sum_{i=2}^{j_0+1}(-v_i + u_i) \cdot p^i - \sum_{i=j_0+2}^{M-j_0-1} \tilde{\omega}_i \cdot p^i - \\ \qquad \sum_{i=M-j_0}^{M-1} \tilde{\omega}_i \cdot p^i \\ s = \tilde{A} - u_1 \cdot p + \sum_{i=2}^{j_0+1}(-v_i - u_i) \cdot p^i - \sum_{i=j_0+2}^{M-j_0-1}(2 \cdot u_i + \tilde{\omega}_i) - \\ \qquad \sum_{i=M-j_0}^{M-1} \tilde{\omega}_i \cdot p^i \end{cases} \quad (124)$$

and (117) is replaced by $$\begin{cases} r = \tilde{A} + u_1 \cdot p + \sum_{i=2}^{j_0+1}(-v_i + u_i) \cdot p^i - \sum_{i=j_0+2}^{M-j_0-1} \tilde{\omega}_i \cdot p^i - \\ \qquad \sum_{i=M-j_0}^{M-1} \tilde{\omega}_i \cdot p^i \\ s = \tilde{A} - u_1 \cdot p + \sum_{i=2}^{j_0+1}(-v_1 - u_i) \cdot p^i + \sum_{i=j_0+2}^{M-j_0-1}(-2 \cdot v_i + \tilde{\omega}_i) \cdot \\ \qquad p^i - \sum_{i=M-j_0}^{M-1} \tilde{\omega}_i \cdot p^i \end{cases} \quad (125)$$

Notice that a priori there is no knowledge of whether $u_{M-1}$ is or is not zero. The same is true for $u_{M-2}$, etc. Therefore, at this point, $j_0$ is an undetermined integer.

NOTE 1: When using (124) and (122), the pair (r, s) is dependent on the set $\{u_i\}$ and on the first elements of $\{v_i\}$, for $2 \leq i \leq j_0+1$. In such cases, the general expression of (r, s) is $$\begin{cases} r = \tilde{\omega}_0 + \tilde{\omega}_1 \cdot p + \tilde{u}_1 \cdot p + \sum_{i=2}^{j_0} \tilde{z}_i \cdot p^i + z_{j_0+1} \cdot p^{j_0+1} \\ s = \tilde{\omega}_0 + \tilde{\omega}_1 \cdot p - \tilde{u}_1 \cdot p + \sum_{i=2}^{j_0} \tilde{z}_i \cdot p^i + z_{j_0+1} p^{j_0+1} - 2 \cdot \\ \qquad \sum_{i=2}^{j_0} \tilde{u}_i \cdot p^i - 2 \cdot \sum_{i=j_0+1}^{M-j_0-1} u_i \cdot p^i \end{cases} \quad (126)$$

where $$z_k = \tilde{\omega}_k - v_k u_k \quad (127)$$

or $$\begin{cases} r = \tilde{\omega}_0 + \tilde{\omega}_1 \cdot p + \tilde{u}_1 \cdot p + \sum_{i=2}^{j_0} \tilde{\zeta}_i \cdot p^i + \zeta_{j_0+1} \cdot p^{j_0+1} + 2 \cdot \\ \qquad \sum_{i=2}^{j_0} \tilde{u}_i \cdot p^i + 2 \cdot \sum_{i=j_0+1}^{M-j_0-1} u_i \cdot p^i \\ s = \tilde{\omega}_0 + \tilde{\omega}_1 \cdot p + \tilde{u}_1 \cdot p + \sum_{i=2}^{j_0} \tilde{\zeta}_i \cdot p^i + \zeta_{j_0+1} \cdot p^{j_0+1} \end{cases} \quad (128)$$

where $$\zeta_k = \tilde{\omega}_k v_k u_k. \quad (129)$$

X. THE PROCESS

1) The Case when $u_{M-1} \neq 0$ ($j_0=0$)

1.1) Overview

Consider the case when $u_{M-1} \neq 0$. In this case (111) becomes $$\begin{cases} r = \tilde{\omega}_0 + (\tilde{\omega}_1 + u_1) \cdot p + 2 \cdot \sum_{i=2}^{M-1} u_i \cdot p^i \\ s = \tilde{\omega}_0 + (\tilde{\omega}_1 - u_1) \cdot p \end{cases} \quad (130)$$

If $$\begin{cases} u_1 \not\equiv 0 \pmod{p} \\ \tilde{\omega}_1 \pm u_1 \not\equiv \pmod{p} \end{cases}, \quad (131)$$

multiplication of r by s modulo $p^M$ yields:

$$\begin{cases} v_0 \equiv \tilde{\omega}_0^2 (\bmod\ p^M) \\ v_1 \equiv 2 \cdot \tilde{\omega}_0 \cdot \tilde{\omega}_1 (\bmod\ p^{M-1}) \\ v_2 \equiv \tilde{\omega}_0 \cdot 2 \cdot u_2 - u_1^2 + \tilde{\omega}_1^2 + (\bmod\ p^{M-2}) \\ v_3 \equiv \tilde{\omega}_0 \cdot 2 \cdot u_3 + (\tilde{\omega}_1 - u_1) \cdot 2 \cdot u_2 (\bmod\ p^{M-3}) \\ \quad \cdots \\ v_{n-2} \equiv \tilde{\omega}_0 \cdot 2 \cdot u_{M-2} + (\tilde{\omega}_1 - u_1) \cdot 2 \cdot u_{M-3} (\bmod\ p^2) \\ v_{n-1} \equiv \tilde{\omega}_0 \cdot 2 \cdot u_{M-1} + (\tilde{\omega}_1 - u_1) \cdot 2 \cdot u_{M-2} (\bmod\ p) \end{cases} \quad (132)$$

Let RH $(132)_i$ and LH $(132)_i$ denote the RHS and the LHS, respectively, of that congruence in (132) which is defined modulo $p^{M-i}$. Then, it must be $$RH\ (132)_i - LH\ (132)_i \equiv 0\ (\bmod\ p^{M-i}). \quad (133)$$

Define $$C(132)_i = \frac{RH(132)_i - LH(132)_i}{p^{M-i}}. \quad (134)$$

There is one condition which is not contained in (132): that is the condition that the sum of all the multiples of $p^M$ in the system be equal to zero. Specifically, refer to (130). If $u_{M-1} \neq 0$, the highest power of p is produced when $(\tilde{\omega}_1 - u_1) \cdot p$ is multiplied by $2 \cdot u_{M-1} \cdot p^{M-1}$. There are other multiples of $p^M$ in the system, specifically $Q \cdot p^M$, $\tilde{\eta}_0 \cdot p^M$ and $\tilde{\eta}_1 \cdot p^M$ and the integers $C(133)_i \cdot p^M$ for $i \geq 2$. (Refer to (87) and (91)). Equating to zero the sum of all the coefficients of $p^M$, it must be $$0 = Q + \tilde{\eta}_0 + \tilde{\eta}_1 + \sum_{i=2}^{M-1} C(132)_i + 2 \cdot (\tilde{\omega}_1 - u_1) \cdot u_{M-1}. \quad (135)$$

1.2) Tidbits

NOTE 1: Refer to (77). By (7), X<N. The magnitude of the integer X is not dependent on the representation of N. If N and X were represented in base p, and X were to approximate closely N, it would be $0 < u_{M-1} < p$ and one of the two factors of N would approximate closely 1.

NOTE 2: In general, the integers $N_0$ are pre-screened to test divisibility by the first elements of the sequence of primes. Thus, it is reasonable to assume that in all cases $u_{M-1}=0$. Recall that the representation of U as in (73), where $\{u_i\}$ are $p^{M-i}$—constrained positive integers, offers many degrees of freedom and no practical limitation on the magnitude of U results when $u_{M-1}$ is set equal to zero. In fact, any integer U can be represented by a multitude of selections of the set $\{u_i\}$.

NOTE 3: There is a peculiar situation when the pair (r, s) can be described as in (130). Consider the case when $v_0$ is a perfect square, say $v_0 = \tilde{A}_0^2 < p$. In these cases $\tilde{\omega}_0$ is a small integer and $\tilde{\omega}_0 = \tilde{A}_0$. Then the second of (130) yields $$\frac{s - \tilde{A}_0}{p} = \tilde{\omega}_1 - u_1. \quad (136)$$

Some cases were observed when $v_0 = \tilde{A}_0^2 < p$, s was two digits long in base p and $u_{M-1}$ was nonzero.

NOTE 4: In this presentation it will be assumed that $\tilde{\omega}_0^2 > p^2$.

2) The Case when $j_0=1$ ($u_{M-1}=0$ and $u_{M-2} \neq 0$)

2.1) Overview

Consider the case when it has been assumed that $u_{M-1}=0$. It is desired to determine a pair of divisors (r, s) when $u_{M-2} \neq 0$, if such a pair exists. In this case (126) and (128) can be written as follows:

$$\begin{cases} u_{M-2} \neq 0 \\ u_{M-1} = 0 \\ r = \tilde{A}_2 + u_1 \cdot p + (-v_2 + u_2) \cdot p^2 \\ s = \tilde{A}_2 - u_1 \cdot p + (-v_2 + u_2) \cdot p^2 - 2 \cdot \sum_{i=3}^{M-2} u_i \cdot p^i \end{cases} \quad (137)$$

where $$\tilde{A}_2 = \tilde{\omega}_0 + \tilde{\omega}_1 \cdot p + \tilde{\omega}_2 p^2 \quad (138)$$

and $$\begin{cases} u_{M-2} \neq 0 \\ u_{M-1} = 0 \\ r = \tilde{A}_1 + u_1 \cdot p + \zeta_2 \cdot p^2 + 2 \cdot \sum_{i=2}^{M-2} u_i \cdot p^i, \\ s = \tilde{A}_1 - u_1 \cdot p + \zeta_2 \cdot p^2 \end{cases} \quad (139)$$

where $$\tilde{A}_1 = \tilde{\omega}_0 + \tilde{\omega}_1 \cdot p \quad (140)$$

and where $\zeta_2$ is defined as in (129):

$$\begin{cases} u_{M-1} = 0 \\ u_{M-2} \neq 0 \\ \zeta_2 = \omega_2 - v_2 - u_2 \end{cases} \quad (141)$$

Compare with (128) and (129).

Using (139), multiply r by s modulo $p^M$. Setting the sum of the coefficients of any given power of p congruent to zero (mod $p^{M-i}$) yields $$\begin{cases} u_{M-2} \neq 0 \\ v_0 \equiv \tilde{\omega}_0^2 (\bmod\ p^M) \\ v_1 \equiv 2 \cdot \tilde{\omega}_0 \cdot \tilde{\omega}_1 (\bmod\ p^{M-1}) \\ v_2 \equiv -u_1^2 + \tilde{\omega}_1^2 + 2 \cdot \tilde{\omega}_0 \cdot \zeta_2 + 2 \cdot \tilde{\omega}_0 \cdot u_2 (\bmod\ p^{M-2}) \\ v_3 \equiv 2 \cdot \tilde{\omega}_0 \cdot u_3 + 2 \cdot (\tilde{\omega}_1 - u_1) \cdot u_2 + 2 \cdot \tilde{\omega}_1 \cdot \zeta_2 (\bmod\ p^{M-3}) \\ v_4 \equiv 2 \cdot \tilde{\omega}_0 \cdot u_4 + 2 \cdot (\tilde{\omega}_1 - u_1) \cdot u_3 + 2 \cdot \zeta_2 \cdot u_2 + \zeta_2^2 (\bmod\ p^{M-4}) \\ \quad \text{for } i > 4 \\ v_i \equiv 2 \cdot \tilde{\omega}_0 \cdot u_i + 2 \cdot (\tilde{\omega}_1 - u_1) \cdot u_{i-1} + 2 \cdot \zeta_2 \cdot u_{i-2} (\bmod\ p^{M-i}) \\ \quad \cdots \\ v_{M-2} \equiv 2 \cdot \tilde{\omega}_0 \cdot u_{M-2} + 2 \cdot (\tilde{\omega}_1 - u_1) \cdot u_{M-3} + 2 \cdot \zeta_2 \cdot u_{M-4} (\bmod\ p^2) \\ v_{M-1} \equiv 2 \cdot (\tilde{\omega}_1 - u_1) \cdot u_{M-2} + 2 \cdot \zeta_2 \cdot u_{M-3} (\bmod\ p^2) \end{cases} \quad (142)$$

Let RH $(142)_i$ and LH $(142)_i$ denote the RHS and the LHS, respectively, of that congruence in (142) which is defined modulo $p^{M-i}$. Then, it must be $$RH\ (142)_i - LH\ (142)_i \equiv 0\ (\bmod\ p^{M-i}). \quad (143)$$

Define $$C(142)_i = \frac{RH(142)_i - LH(142)_i}{p^{M-i}}. \qquad (144)$$

There is one condition which is not contained in (142): that is the condition that the sum of all the multiples of $p^M$ in the system be equal to zero. Specifically, refer to (139). If $u_{M-2} \neq 0$, the highest power of p is produced when $\zeta_2 \cdot p^2$ is multiplied by $2 \cdot u_{M-2} \cdot p^{M-2}$. The other multiples of $p^M$ in the system are $Q \cdot p^M$, $\tilde{\eta}_0 \cdot p^M$, $\tilde{\eta}_1 \cdot p^M$ and the integers $C(142)_i \cdot p^M$. Then, equating to zero the sum of the coefficients of $p^M$, it must be $$0 = Q + \tilde{\eta}_0 + \tilde{\eta}_1 + \sum_{i=2}^{M-1} C(142)_i + 2 \cdot \zeta_2 \cdot u_{M-2}. \qquad (145)$$

Refer to (88) and (91).
In this equation the integer $u_{M-2}$ is defined modulo $p^2$ by the second last congruence of (142).
Also, in the computation of $C(142)_{M-1}$, the integers $u_{M-2}$ and $u_{M-3}$ equal the corresponding values in the second last congruence of (142).
The set of congruences (142) can be referred to as a SUPERCONGRUENCE.

2.2) Tidbits
1) Subject to the condition (131), if (142) and (145) do not admit integer solutions, there does not exist an integer r which can be described as in (142) and such that r|N.
2) The system (142) consists of M congruences. Given the selection of an integer $u_1 < p$, the third congruence of (142) defines a corresponding value of $v_2$ modulo $p^{M-2}$.
3) The selection of an integer $u_2 < p$ defines $$\zeta_2 = \omega_2 - v_2 - u_2. \qquad (146)$$

Refer to (141).
4) The solution of the fourth congruence of (142) produces a corresponding $u_3$.
5) The last congruence of (142) verifies the compatibility between $\tilde{u}_{M-2}$ and $v_{M-1}$ and causes a paring down of the roster of candidate pairs $(u_1, u_2)$.
6) If the system (142) produces a candidate pair $(u_1, u_2)$, the viability of that pair should be tested using (145). Of course, (145) can be satisfied only if $$0 \equiv Q_0 + \tilde{\eta}_0 + \tilde{\eta}_1 + \sum_{i=2}^{M-1} C(142)_i + 2 \cdot \zeta_2 \cdot u_{M-2} (\text{mod } p). \qquad (147)$$

Refer to (87).
NOTE 1: To expedite the execution of (142), observe that each one of the higher degree congruences of (142) must hold true if they were reduced modulo $p^2$. Therefore, (142) could be reduced as follows:

$$\begin{cases}
u_{M-2} \neq 0 \\
u_{M-1} = 0 \\
v_0 \equiv \tilde{\omega}_0^2 (\text{mod } p^2) \\
v_1 \equiv 2 \cdot \tilde{\omega}_0 \cdot \tilde{\omega}_1 (\text{mod } p^2) \\
v_2 \equiv -u_1^2 + \tilde{\omega}_1^2 + 2 \cdot \tilde{\omega}_0 \cdot \zeta_2 + 2 \cdot \tilde{\omega}_0 \cdot u_2 (\text{mod } p^2) \\
v_3 \equiv 2 \cdot \tilde{\omega}_0 \cdot u_3 + 2 \cdot (\tilde{\omega}_1 - u_1) \cdot u_2 + 2 \cdot \tilde{\omega}_1 \cdot \zeta_2 (\text{mod } p^2) \\
v_4 \equiv 2 \cdot \tilde{\omega}_0 \cdot u_4 + 2 \cdot (\tilde{\omega}_1 - u_1) \cdot u_3 + 2 \cdot \zeta_2 \cdot u_2 + \zeta_2^2 (\text{mod } p^2) \\
\text{for } i > 4 \\
v_i \equiv 2 \cdot \tilde{\omega}_0 \cdot u_i + 2 \cdot (\tilde{\omega}_1 - u_1) \cdot u_{i-1} + 2 \cdot \zeta_2 \cdot u_{i-2} (\text{mod } p^2) \\
\ldots \\
v_{M-2} \equiv 2 \cdot \tilde{\omega}_0 \cdot u_{M-2} + 2 \cdot (\tilde{\omega}_1 - u_1) \cdot u_{M-3} + 2 \cdot \zeta_2 \cdot u_{M-4} (\text{mod } p^2) \\
v_{M-1} \equiv 2 \cdot (\tilde{\omega}_1 - u_1) \cdot u_{M-2} + 2 \cdot \zeta_2 \cdot u_{M-3} (\text{mod } p^2)
\end{cases} \qquad (148)$$

In (148) each congruence produces a carry which must be added to $C(142)_{M-1}$. For $i < M-1$ the carries produced by the congruences (148) are $$C(148)_i = \frac{RH(148)_i - LH(148)_i}{p^2}. \qquad (149)$$

The total of these carries must satisfy the following:

$$0 \equiv Q_0 + \tilde{\eta}_0 + \tilde{\eta}_1 + \sum_{i=2}^{M-2} C(148)_i + C(142)_{M-1} + 2 \cdot \zeta_2 \cdot \tilde{u}_{M-2} (\text{mod } p). \qquad (150)$$

Notice that the magnitude of M does not burden the execution time of any of the congruences of (148). However, it determines the NUMBER of such congruences and the time required to execute the addition of M two digit numbers (which are represented in base p).

2.3) A Test
Consider the case when the true divisors of $N_0$, say $\tilde{r}_0$ and $\tilde{s}_0$, are known. Then, after the computation of $\tilde{T}_0, N_{T_0}$ and the definition of M, the system (142) can be set into place.
If the true solution pair $(\tilde{r}_0, \tilde{s}_0)$ were known, it would be $$\tilde{s}_0 \equiv \tilde{\omega}_0 + (\tilde{\omega}_1 - \tilde{u}_{1,1}) \cdot p + (\tilde{\omega}_2 - \tilde{v}_2 \tilde{u}_{2,1}) \cdot p^2 (\text{mod } p^3), \qquad (151)$$

and the pair $(\tilde{u}_{1,1}, \tilde{u}_{2,1})$ would be an element of the set of pairs which satisfy (142). (Table I).
In general, such is not the case.
The contradiction can be explained by observing that, given $N_0$, the set of feasible pairs represented in Table I is dependent on the prior definition of M. Should M be replaced by some $M_1 = M + 2 \cdot m_1$ ($m_1$ integer>0), the set of feasible pairs in Table I would be different.
Since $\tilde{s}_0$ is not known, the situation can be addressed by exploring independently all the possible definitions of (148), each one associated with a distinct value of M.

TABLE I

PART 1
Example of Feasible $(u_{1,1}, u_{2,1})$ Pairs
Statement of the Problem $N_0$ = 100301961039186938810056007
= 165636239140553 · 605555653519
$p$ = 29

TABLE I-continued $r_0 = 15 + 8 \cdot p + 23 \cdot p^2 + 3 \cdot p^3 + 20 \cdot p^4 + 26 \cdot p^5 + 4 \cdot p^6 + 3 \cdot p^7 + 12 \cdot p^8 + 11 \cdot p^9$
$s_0 = 20 + 5 \cdot p + 2 \cdot p^2 + 2 \cdot p^3 + 7 \cdot p^4 + 1 \cdot p^5 + 3 \cdot p^6 + 6 \cdot p^7 + 1 \cdot p^8$
$\alpha = 15$
$p^{n_0-1} < N_0 < p^{n_0}$
$n_0 = 18$
$T_0 = 22306282506644511812 1878597$
$T_0 \cdot \alpha \equiv 20 \pmod{p}$
$N_{T_0} = T_0 \cdot N_0 = 2237363878910554992317807239073749209461830 1624582179$
$n_{T_0} = 36$
$p^{n_{T_0}-1} < N_{T_0} < p^{n_{T_0}}$
$M = 4097$
$M - 1 > 2 \cdot n_{T_0} - 2$
$\omega_0 \approx 4.78 \times 10^{748}$
$\omega_1 \approx 3.765 \times 10^{748}$
$A \approx 4.11 \times 10^{752}$

| PART 2 |  |
|---|---|
| Feasible $(u_{1,1}, u_{2,1})$ Pairs | |
| $u_{1,1}$ | $u_{2,1}$ |
| 1 | 1 |
| 3 | 20 |
| 3 | 27 |
| 3 | 28 |
| 4 | 1 |
| 5 | 15 |
| 5 | 22 |
| 6 | 1 |
| 6 | 7 |
| 6 | 28 |
| 7 | 14 |
| 8 | 14 |
| 10 | 28 |
| 11 | 25 |
| 12 | 2 |
| 12 | 9 |
| 13 | 19 |
| 15 | 3 |
| 15 | 4 |
| 15 | 26 |
| 16 | 10 |
| 17 | 20 |
| 18 | 5 |
| 19 | 5 |
| 19 | 15 |
| 19 | 17 |
| 19 | 25 |
| 22 | 10 |
| 23 | 20 |
| 23 | 23 |
| 23 | 26 |
| 24 | 9 |
| 25 | 28 |
| 27 | 3 |
| 27 | 25 |

| Solutions of (150) | |
|---|---|
| $u_{1,1}$ | $u_{2,1}$ |
| 7 | 14 |

| Correct Solution | |
|---|---|
| $u_{1,1}$ | $u_{2,1}$ |
| 3 | 20 |

2.4) The Periodic Components of (148)

Consider the case when M has been defined using (78). In this case the system (142) consists of M congruences. The LHS of the last n−1 congruences is congruent to zero modulo $p^{M-i}$. Thus, if n−1<i<M−1, it is $$0 \equiv 2 \cdot \tilde{\omega}_0 \cdot u_i + 2 \cdot (\tilde{\omega}_1 - u_1) \cdot u_{i-1} + 2 \cdot \zeta_2 \cdot u_{i-2} \pmod{p^2}. \quad (152)$$

Notice that the coefficients $\tilde{\omega}_0$, $\tilde{\omega}_1 - u_1$, and $\zeta_2$, after reduction modulo $p^2$, do not depend on i, but depend on the selection of the pair $(u_1, u_2)$.

Thus, the system (142) contains a sequence of components which are related to one another as follows:

$$\begin{cases} \ldots \\ 0 \equiv 2 \cdot \tilde{\omega}_0 \cdot u_i + 2 \cdot (\tilde{\omega}_1 - u_1) \cdot u_{i-1} + 2 \cdot \zeta_2 \cdot u_{i-2} \pmod{p^2} \\ 0 \equiv 2 \cdot \tilde{\omega}_0 \cdot u_{i+1} + 2 \cdot (\tilde{\omega}_1 - u_1) \cdot u_i + 2 \cdot \zeta_2 \cdot u_{i-1} \pmod{p^2} \\ 0 \equiv 2 \cdot \tilde{\omega}_0 \cdot u_{i+2} + 2 \cdot (\tilde{\omega}_1 - u_1) \cdot u_{i+1} + 2 \cdot \zeta_2 \cdot u_i \pmod{p^2} \\ 0 \equiv 2 \cdot \tilde{\omega}_0 \cdot u_{i+3} + 2 \cdot (\tilde{\omega}_1 - u_1) \cdot u_{i+2} + 2 \cdot \zeta_2 \cdot u_{i+1} \pmod{p^2} \\ \ldots \end{cases} \quad (153)$$

To clarify the role of the integer p−1, assume that (142) is satisfied. Then, if $\omega_1 - u_1 \not\equiv 0 \pmod{p}$, and $\zeta_2 \not\equiv 0 \pmod{p}$ (131), it will be $$0 \equiv \zeta_2^{-1} \cdot (\omega_1 - u_1) \cdot u_{M-2} + u_{M-3} \pmod{p}, \quad (154)$$

and $$0 \equiv \zeta_2^{-1} \cdot \omega_0 \cdot u_{M-2} + \zeta_2^{-1} \cdot (\omega_1 - u_1) \cdot u_{M-3} + u_{M-4} \pmod{p}, \quad (155)$$

whence $$0 \equiv (\zeta_2^{-1} \cdot \omega_0 - \zeta_2^{-2} \cdot (\omega_1 - u_1)^2) \cdot u_{M-2} + u_{M-4} \pmod{p}. \quad (156)$$

In a similar fashion, $$0 \equiv \zeta_2^{-1} \cdot \omega_0 \cdot u_{M-3} + \zeta_2^{-1} \cdot (\omega_1 - u_1) \cdot u_{M-4} + u_{M-5} \pmod{p}$$

$$\equiv -\zeta_2^{-2} \cdot \omega_0 \cdot (\omega_1 - u_1) \cdot u_{M-2} - \zeta_2^{-2} \cdot \omega_0 \cdot (\omega_1 - u_1) \cdot u_{M-2}$$

$$- \zeta_2^{-3} \cdot (\omega_1 - u_1)^3 \cdot u_{M-2} + u_{M-5} \pmod{p}$$

$$\equiv [-2 \cdot \zeta_2^{-2} \cdot \omega_0 \cdot (\omega_1 - u_1) + \zeta_2^{-3} \cdot (\omega_1 - u_1)^3] \cdot u_{M-2} + u_{M-5} \pmod{p}. \quad (157)$$

Similar relationships can be developed to relate $u_{M-i}$ to $u_{M-2}$ modulo p. Such relationships contain two terms. As i increases, both terms display a periodicity of p−1, or its divisors.

Thus, given a selection of the pair $(u_1, u_2)$, the specific embodiment of (142) for a given M can be related to a corresponding embodiment for $M' = M + k \cdot (p-1)$ for some integer k. Recall that, if M is increased by p−1, the number of congruences in (142) is increased by p−1.

2.5) A New Definition of M

The variability of M can be reduced by observing (24) and (41). Consider a process which evolves (24) into (41). Assume it can be iterated into higher powers of p until the resulting product $r \cdot s_0$ exceeds the corresponding N. The process could end at that point and would offer a conclusion on the viability of $\tilde{\alpha}$, $\tilde{U}_{1,1}$ and the subsequent sets of $(U_i, V_{2,i})$ variables.

Notice that in (32), after multiplication of r by $s_0$, the highest power of p in the system is $p^4$. In (37) it is $p^8$. In the subsequent iterations it would be $p^{2^k}$ for k≥2. Thus, it is reasonable to select $$M = 2^h + 1, \text{ for } h > 0 \quad (158)$$

or $$\begin{cases} M - 1 = 2^h, \text{ for } h > 0 \\ 2^h > n - 1 \end{cases} \quad (159)$$

Compare with (78).

2.6) Privileged sets of exponents M

Consider the case when an integer $k \cdot (p-1)$ is added to M. It is desired that the pairs $(u_1, u_2)$ be proven still viable when M is replaced by $M_1 = M + k \cdot (p-1)$. This condition can be satisfied if both $M_1$ and M satisfy (159).

In this case, $$2^h + k \cdot 4 \cdot ODD = 2^j \quad (160)$$

or $$1 + k' \cdot ODD = 2^{j-h}$$

where $$k = 2^{h-2} \cdot k'. \quad (161)$$

If $p = 29 = 4 \cdot 7 + 1$, the condition is satisfied when k′=1 and $j - h = 2^3$.

For the example of Table I, Table II shows the feasible $(u_1, u_2)$ pairs for a sequence of values of M which satisfy (159).

Table III discards the $(u_1, u_2)$ pairs which are not confirmed when M−1 is multiplied by $p^3$.

Table IV shows an example of confirmed pair when p=61.

Table V shows the values of k′ and $p^{j-h}$ for a set of primes of the form $p = 4 \cdot ODD + 1$.

TABLE II

Feasible $(u_{1,1}, u_{2,1})$ Pairs for the Example of TABLE I with Increments of M by $2^3$

| M | $(u_{1,1}, u_{2,1})$ |
|---|---|
| | PART 1 |
| 65 | (1, 1), (1, 28), (3, 5), (3, 20), (3, 28), (5, 15), (5, 23), (6, 1), (6, 7), (6, 28), (7, 14), (7, 15), (8, 14), (10, 15), (10, 28), (12, 9), (15, 4), (16, 21), (16, 23), (17, 20), (18, 5), (18, 19), (18, 23), (19, 0), (19, 4), (19, 5), (19, 8), (19, 17), (19, 25), (20, 0), (20, 3), (23, 14), (23, 20), (23, 23), (25, 28), (26, 17), (27, 3), (27, 25), (28, 1) |
| 129 | (1, 0), (1, 23), (4, 19), (5, 3), (6, 9), (6, 11), (6, 16), (9, 3), (10, 17), (11, 18), (12, 7), (12, 15), (13, 16), (14, 23), (15, 0), (15, 4), (15, 25), (16, 4), (19, 26), (20, 1), (21, 8), (23, 1), (23, 22), (23, 28), (24, 1), (25, 7), (26, 23) |
| 257 | (2, 26), (4, 20), (5, 8), (5, 20), (6, 3), (6, 9), (7, 19), (10, 14), (12, 26), (13, 19), (13, 26), (14, 3), (14, 26), (15, 6), (16, 10), (17, 27), (18, 4), (20, 22), (21, 2), (21, 26), (23, 1), (23, 22), (23, 28), (24, 7), (24, 14), (26, 2) |

TABLE II-continued

Feasible ($u_{1,1}$, $u_{2,1}$) Pairs for the Example of TABLE I with Increments of M by $2^3$

| M | ($u_{1,1}$, $u_{2,1}$) |
|---|---|
| 513 | (1, 1), (3, 20), (3, 28), (6, 1), (6, 7), (6, 28), (7, 14), (8, 14), (10, 28), (12, 9), (14, 4), (15, 4), (15, 27), (16, 13), (17, 20), (17, 22), (18, 5), (18, 14), (19, 5), (19, 17), (19, 25), (20, 15), (23, 13), (23, 20), (23, 23), (24, 23), (25, 11), (25, 28), (26, 20), (26, 27), (27, 25) |
| 1025 | (1, 23), (1, 28), (2, 11), (2, 26), (5, 3), (6, 5), (6, 9), (6, 11), (6, 15), (9, 0), (9, 3), (9, 26), (10, 0), (10, 17), (10, 21), (10, 25), (11, 6), (11, 10), (13, 6), (13, 8), (14, 0), (14, 23), (15, 4), (16, 4), (20, 1), (23, 1), (23, 22), (23, 28), (24, 1), (24, 6), (24, 14), (26, 23), (26, 24), (28, 1), (28, 27) |

PART 2

| M | ($u_{1,1}$, $u_{2,1}$) |
|---|---|
| 65 | (1, 1), (1, 28), (3, 5), (3, 20), (3, 28), (5, 15), (5, 23), (6, 1), (6, 7), (6, 28), (7, 14), (7, 15), (8, 14), (10, 15), (10, 28), (12, 9), (15, 4), (16, 21), (16, 23), (17, 20), (18, 5), (18, 19), (18, 23), (19, 0), (19, 4), (19, 5), (19, 8), (19, 17), (19, 25), (20, 0), (20, 3), (23, 14), (23, 20), (23, 23), (25, 28), (26, 17), (27, 3), (27, 25), (28, 1) |
| 129 | (1, 0), (1, 23), (4, 19), (5, 3), (6, 9), (6, 11), (6, 16), (9, 3), (10, 17), (11, 18), (12, 7), (12, 15), (13, 16), (14, 23), (15, 0), (15, 4), (15, 25), (16, 4), (19, 26), (20, 1), (21, 8), (23, 1), (23, 22), (23, 28), (24, 1), (25, 7), (26, 23) |
| 257 | (2, 26), (4, 20), (5, 8), (5, 20), (6, 3), (6, 9), (7, 19), (10, 14), (12, 26), (13, 19), (13, 26), (14, 3), (14, 26), (15, 6), (16, 10), (17, 27), (18, 4), (20, 22), (21, 2), (21, 26), (23, 1), (23, 22), (23, 28), (24, 7), (24, 14), (26, 2) |
| 513 | (1, 1), (3, 20), (3, 28), (6, 1), (6, 7), (6, 28), (7, 14), (8, 14), (10, 28), (12, 9), (14, 4), (15, 4), (15, 27), (16, 13), (17, 20), (17, 22), (18, 5), (18, 14), (19, 5), (19, 17), (19, 25), (20, 15), (23, 13), (23, 20), (23, 23), (24, 23), (25, 11), (25, 28), (26, 20), (26, 27), (27, 25) |
| 1025 | (1, 23), (1, 28), (2, 11), (2, 26), (5, 3), (6, 5), (6, 9), (6, 11), (6, 15), (9, 0), (9, 3), (9, 26), (10, 0), (10, 17), (10, 21), (10, 25), (11, 6), (11, 10), (13, 6), (13, 8), (14, 0), (14, 23), (15, 4), (16, 4), (20, 1), (23, 1), (23, 22), (23, 28), (24, 1), (24, 6), (24, 14), (26, 23), (26, 24), (28, 1), (28, 27) |

TABLE III

Example of Confirmed ($u_{1,1}$, $u_{2,1}$) Pairs in Table II

| M | ($u_{1,1}$, $u_{2,1}$) |
|---|---|
| 65, 513, 4097, 32769 | (1, 1), (3, 20), (3, 28), (6, 1), (6, 7), (6, 28), (7, 14), (8, 14), (10, 28), (12, 9), (15, 4), (17, 20), (18, 5), (19, 5), (19, 17), (19, 25), (23, 20), (23, 23), (25, 28), (27, 25) |
| 129, 1025, 8193 | (1, 23), (5, 3), (6, 9), (6, 11), (9, 3), (10, 17), (14, 23), (15, 4), (16, 4), (20, 1), (23, 1), (23, 22), (23, 28), (24, 1), (26, 23) |
| 257, 2049, 16385 | (4, 20), (5, 8), (6, 9), (12, 26), (13, 26), (15, 6), (20, 22), (21, 2), (21, 26), (23, 1), (23, 22), (23, 28) |

TABLE IV

Example of Confirmed ($u_{1,1}$, $u_{2,1}$) Pairs with Increment of M by $2^4$ for p = 61

$N_0$ = 100301963155892971368528833
= 165636239140789 · 605555666297
p = 29
$r_0$ = $54 + 22 \cdot p + 32 \cdot p^2 + 34 \cdot p^3 + 55 \cdot p^4 + 58 \cdot p^5 + 42 \cdot p^6 + 52 \cdot p^7$
$s_0$ = $27 + 57 \cdot p + 24 \cdot p^2 + 34 \cdot p^3 + 59 \cdot p^4 + 45 \cdot p^5 + 11 \cdot p^6$
α = 54
$p^{n_0-1} < N_0 < p^{n_0}$
$n_0$ = 15
$T_0$ = 351071793171532742034651427
$T_0 \cdot \alpha \equiv 27 \pmod{p}$
$N_{T_0}$ = $T_0 \cdot N_0$ = 35213190063742146757748863016054424768295755644901191
$p^{n_{T_0}-1} < N_{T_0} < p^{n_{T_0}}$
$n_{T_0}$ = 30
M − 1 > 2 · $n_{T_0}$
M = 4097

| M | List of Confirmed ($u_{1,1}$, $u_{2,1}$) |
|---|---|
| 65, 1025 | (2, 20), (4, 52), (6, 15), (8, 3), (11, 9), (12, 24), (12, 53), (12, 56), (15, 60), (20, 34), (22, 45), (22, 60), (24, 24), (24, 46), (24, 49), |

TABLE IV-continued

| | |
|---|---|
| | (29, 54), (30, 58), (32, 9), (32, 38), (33, 35), (35, 32), (43, 26), (43, 43), (44, 53), (47, 13), (50, 48), (52, 2), (54, 34), (54, 47), (55, 42), (57, 35), (58, 41) |
| 129, 2049 | no $(u_{1,1}, u_{2,1})$ confirmed pairs |
| 257, 4097 | (2, 25), (3, 49), (4, 26), (9, 5), (10, 56), (12 7), (14, 44), (16, 28), (18, 23), (19, 34), (24, 36), (25, 14), (28, 26), (29, 52), (30, 54), (31, 2), (31, 52), (32, 1), (33, 4), (36, 18), (37, 12), (41, 27), (44, 1), (46, 9), (48, 0), (49, 5), (49, 8), (49, 37), (50, 52), (53, 1), (55, 39) |
| 513, 8193 | (18, 55), (37, 39) |

| Correct Solution | |
|---|---|
| $u_{1,1}$ | $u_{2,1}$ |
| 20 | 34 |

TABLE V

Examples of Privileged Sets of Exponents

| p | (p − 1)/4 | k' | $2^{j-h}$ |
|---|---|---|---|
| 13 | 3 | 1 | $2^2$ |
| 29 | 7 | 1 | $2^3$ |
| 37 | 9 | 7 | $2^6$ |
| 53 | 13 | 315 | $2^{12}$ |
| 61 | 15 | 1 | $2^4$ |
| 101 | 25 | 41, 943 | $2^{20}$ |

NOTE 1: The periodicity of (148) is dependent on the periodicity of the two coefficients of $u_{M-2}$ in (157). If both coefficients have periodicity p−1, the resulting periodicity of (148) and M are illustrated by Table V.

However, in general, each one of the two coefficients of $u_{M-2}$ may have its own periodicity, which equals any one of the divisors of p−1.

Table VI shows a case when p=29 and the integer $2^{j-h}$ of Table V is replaced by $2^4$.

2.7) The Determination of $U_{1,2}$

The system (142) has been developed without placing any condition on the magnitude of $u_1$, $u_2$, and the subsequent $u_i$'s. It is useful to explore the case when $u_1$ and $u_2$ are defined as follows:

TABLE VI

Example of a Different Periodicity of M for p = 29

$N_0$ = 100301962714574772614226437
 = 165636239140789 · 605555663633
$p$ = 29
$r_0$ = 19 + 16 · p + 23 · $p^2$ + 3 · $p^3$ + 20 · $p^4$ + 26 · $p^5$ + 4 · $p^6$ + 3 · $p^7$ + 12 · $p^8$ + 11 · $p^9$
$s_0$ = 13 + 6 · p + 14 · $p^2$ + 2 · $p^3$ + 7 · $p^4$ + 1 · $p^5$ + 3 · $p^6$ + 6 · $p^7$ + 1 · $p^8$
$\alpha$ = 19
$p^{n_0-1} < N_0 < p^{n_0}$
$n_0$ = 18
$T_0$ = 21831392331104971683143589l
$T_0 · \alpha \equiv$ 20 (modp)
$N_{T_0}$ = $T_0 · N_0$ = 2189731499601744498625046289284331654317364892850367
$p^{n_{T_0}-1} < N_{T_0} < p^{n_{T_0}}$
$n_{T_0}$ = 36
M − 1 > 2 · $n_{T_0}$ − 2
M = 4097
$\omega_0 \approx$ 1.24 × $10^{2996}$
$\omega_1 \approx$ 9.57 × $10^{2994}$
A ≈ 2.86 × $10^{2999}$

| M | List of Confirmed $(u_{1,1}, u_{2,1})$ |
|---|---|
| 65, 1025 | (2, 8), (4, 15), (5, 25), (9, 2), (9, 12), (13, 4), (13, 18), (14, 18), (14, 22), (15, 20), (18, 13), (22, 0), (22, 8), (26, 4), (26, 15), (28, 20) |
| 129, 2049 | (3, 6), (4, 14), (4, 15), (5, 25), (6, 4), (8, 6), (9, 13), (9, 18), (13, 8), (13, 19), (14, 17), (14, 19), (28, 20) |
| 257, 4097 | (1, 9), (3, 14), (5, 14), (6, 10), (7, 8), (9, 7), (11, 25), (15, 11), (16, 16), (18, 10), (19, 15), (20, 21), (20, 27), (21, 20), (21, 21), (23, 9), (24, 4), (24, 21), (25, 14), (27, 11), (28, 1) |
| 513 | no $(u_{1,1}, u_{2,1})$ confirmed pairs |

| Correct Solution | |
|---|---|
| $u_{1,1}$ | $u_{2,1}$ |
| 22 | 8 |

$$\begin{cases} U_{1,2} = u_{1,1} + u_{1,2} \cdot p \\ U_{2,2} = u_{2,1} + u_{2,2} \cdot p \end{cases} \quad (162)$$

where $0 \leq u_{1,1}, u_{2,1} < p$. Refer to (76).

Consider the system (128) when $j_0 = 1$. In this case the general expression of s is $$s \equiv \tilde{\omega}_0 + (\tilde{\omega}_1 - u_1) \cdot p + (\tilde{\omega}_2 - \tilde{v}_2 - u_2) \cdot p^2 (\text{mod } p^3). \quad (163)$$

If the pair $(u_{1,1}, u_{2,1})$ were substituted in lieu of $(u_1, u_2)$, it would be $$s \equiv \tilde{\omega}_0 + (\tilde{\omega}_1 - u_{1,1}) \cdot p + (\tilde{\omega}_2 - \tilde{v}_2 - u_{2,1}) \cdot p^2 (\text{mod } p^3). \quad (164)$$

If the pair $(U_{1,2}, U_{2,2})$ were substituted in lieu of $(u_1, u_2)$, it would be $$s \equiv \tilde{\omega}_0 + (\tilde{\omega}_1 - U_{1,2}) \cdot p + (\tilde{\omega}_2 - \tilde{v}_2 - U_{2,2}) \cdot p^2 (\text{mod } p^4). \quad (165)$$

If $u_{1,2} \neq 0$, reduction of (165) modulo $p^3$ would produce a congruence which is not consistent with (164). Therefore, $u_{1,2}$ must equal zero.

2.8) The Determination of $U_{2,2}$

Consider the case when, given M, the systems (142) and (148) have produced a set of viable pairs $(u_{1,1}, u_{2,1})$. Such pairs define viable expressions of s (mod $p^3$).

It is desired to define corresponding viable expressions of s (mod $p^4$).

This can be accomplished by defining that value of $U_{2,2}$ which satisfies both (142) and the corresponding condition on the carries. For this purpose:

1) Substitute a candidate $U_{2,2}$ into (142) in lieu of $u_2$.
2) Define the integer $$\zeta_{2,2} = \tilde{\omega}_2 \tilde{v}_2 - U_{2,2} \quad (166)$$

and substitute it into (142) in lieu of $\zeta_2$.

Notice that after these substitutions, every selection of $U_{2,2}$ satisfies (142). However, the pair $(u_{1,1}, u_{2,1})$ is feasible only if there exists at least one value of $u_{2,2}$ which satisfies the condition (147) on the carries modulo p To produce the solution $u_{2,2}$, it is convenient to use an approach similar to (148). Specifically, after replacement of $u_{2,1}$ by $U_{2,2}$, all the congruences of (148), with the exception of the last two congruences, can be reduced modulo $p^3$ yielding $$\begin{cases} u_{M-2} \neq 0 \\ u_{M-1} = 0 \\ v_0 \equiv \tilde{\omega}_0^2 (\text{mod } p^3) \\ v_1 \equiv 2 \cdot \tilde{\omega}_0 \cdot \tilde{\omega}_1 (\text{mod } p^3) \\ v_2 \equiv -u_1^2 + \tilde{\omega}_1^2 + 2 \cdot \tilde{\omega}_0 \cdot \zeta_{2,2} + 2 \cdot \tilde{\omega}_0 \cdot u_2 (\text{mod } p^3) \\ v_3 \equiv 2 \cdot \tilde{\omega}_0 \cdot u_3 + 2 \cdot (\tilde{\omega}_1 - u_1) \cdot u_2 + 2 \cdot \tilde{\omega}_1 \cdot \zeta_{2,2} (\text{mod } p^3) \\ v_4 \equiv 2 \cdot \tilde{\omega}_0 \cdot u_4 + 2 \cdot (\tilde{\omega}_1 - u_1) \cdot u_3 + 2 \cdot \zeta_{2,2} \cdot u_2 + \zeta_{2,2}^2 (\text{mod } p^3) \\ \text{for } i > 4 \\ v_i \equiv 2 \cdot \tilde{\omega}_0 \cdot u_i + 2 \cdot (\tilde{\omega}_1 - u_1) \cdot u_{i-1} + 2 \cdot \zeta_{2,2} \cdot u_{i-2} (\text{mod } p^3) \\ \ldots \\ v_{M-3} \equiv 2 \cdot \tilde{\omega}_0 \cdot u_{M-3} + 2 \cdot (\tilde{\omega}_1 - u_1) \cdot u_{M-4} + 2 \cdot \zeta_{2,2} \cdot \\ \quad u_{M-5} (\text{mod } p^3) \\ v_{M-2} \equiv 2 \cdot \tilde{\omega}_0 \cdot u_{M-2} + 2 \cdot (\tilde{\omega}_1 - u_1) \cdot u_{M-3} + 2 \cdot \zeta_{2,2} \cdot \\ \quad u_{M-4} (\text{mod } p^2) \\ v_{M-1} \equiv 2 \cdot (\tilde{\omega}_1 - u_1) \cdot u_{M-2} + 2 \cdot \zeta_{2,2} \cdot u_{M-3} (\text{mod } p) \end{cases} \quad (167)$$

Correspondingly, with the exception of the last two congruences, the carries should be defined as $$C(167)_i = \frac{RH(167)_i - LH(167)_i}{p^3} \quad (168)$$

and the condition (150) can be restated as follows:

$$0 \equiv Q_0 + \tilde{\eta}_0 + \tilde{\eta}_1 + \sum_{i=2}^{M-3} C(167)_i + \quad (169)$$
$$C(142)_{M-2} + C(142)_{M-1} + 2 \cdot \zeta_{2,2} \cdot \tilde{u}_{M-2} (\text{mod } p).$$

NOTE 1: Compare two different expressions of s (mod $p^4$):

$$s \equiv \tilde{\omega}_0 + (\tilde{\omega}_1 - u_1) p + (\tilde{\omega}_2 - \tilde{v}_2 - u_2) p^2 + (\tilde{\omega}_3 - v_3 - u_3) \cdot p^3 (\text{mod } p^4) \quad (170)$$

and $$s \equiv \tilde{\omega}_0 + (\tilde{\omega}_1 - u_1) p^2 + (\tilde{\omega}_2 - v_2 - u_{2,1} - u_{2,2} \cdot p) \cdot p^2 (\text{mod } p^4) \quad (171)$$

Then $$-u_{2,2} \equiv \tilde{\omega}_3 v_3 - u_3 \, (\text{mod } p). \quad (172)$$

Recall that $v_3$ can be computed using (94).

Table VII shows the resulting $(u_{1,1}, u_{2,1}, u_{3,1})$ triads for the example of Table III.

TABLE VII

| | Confirmed $(u_{1,1}, u_{2,1}, u_{3,1})$ triads for the Example of Table III |
|---|---|
| M | $(u_{1,1}, u_{2,1}, u_{3,1})$ |
| 65, 513, 4097, 32769 | (1, 1, 9), (1, 1, 28), (3, 20, 6), (3, 28, 25), (6, 1, 5), (10, 28, 4), (10, 28, 24), (12, 9, 8), (12, 9, 12), (15, 4, 25), (17, 20, 2), (17, 20, 27), (19, 5, 4), (19, 5, 12), (19, 17, 5), (19, 17, 25), (19, 25, 25), (23, 20, 1), (23, 20, 25) |
| 129, 1025, 8193 | (1, 23, 8), (1, 23, 15), (5, 3, 24), (6, 11, 21), (10, 17, 8), (10, 17, 27), (15, 4, 10), (16, 4, 12), (20, 1, 3), (20, 1, 10), (20, 1, 27), (23, 22, 1), (23, 22, 4), (23, 22, 8), (23, 28, 5), (23, 28, 22), (24, 1, 3), (24, 1, 13), (24, 1, 20), (24, 1, 21), (26, 23, 1) |
| 257, 2049, 16385 | (4, 20, 27), (13, 26, 24), (20, 22, 23), (23, 22, 3), (23, 22, 5), (23, 22, 21), (23, 22, 22) |

NOTE 2: In general, the execution of (167) and the corresponding (169) produce only one candidate value of $u_{2,2}$. In some cases, more than one value results. In these cases, all the corresponding value of $U_{2,2}$ must be explored.

2.9) The General Case

After the determination of $U_{2,2}$, a similar procedure can be employed to determine $U_{2,3}$, where $$\zeta_{2,3} = \tilde{\omega}_2 - v_2 - u_{2,1} - u_{2,2} \cdot p - u_{2,3} \cdot p^2 \quad (173)$$

In this case the moduli of (167) should be increased to $p^4$ and the corresponding carries (168) should be adjusted accordingly. The resulting condition on the carries (169) would be computed modulo $p^2$.

Thereafter, the procedure can be iterated to determine the higher components of U.

Each step would propose a new value of s as a candidate divisor of $N_0$. If none of such steps offers a divisor of $N_0$, the initial $(u_{1,1}, u_{2,1})$ pair must be discarded.

2.10) Execution Time

This section contains an estimate of the upper bound of the time required to factor N using the procedure just described.

For the purpose of this estimate, it will be assumed that elementary arithmetic operations require a time of an order not exceeding $\log_p^2 N$, where p denotes the base of representation of N.

The same can be assumed for the computation of multiplicative inverses, other linear congruences and square roots.

The proposed algorithm requires repeated execution of supercongruences such as (142) or (148). These systems consist of M congruences which are defined by a modulus as high as $p^M$. Thus, their execution can be assumed to require a time of the order of $M^3$.

Usually (142) is executed for the purpose of identifying the feasible values of a particular variable. Such is the case when (142) is executed to identify the values of $u_{2,1}$ which are consistent with a known $u_{1,1}$. Thus, the execution time of a supercongruence is $p \cdot M^3$.

Accounting for the variability of $u_{1,1}$ and $\alpha$, the production of all the feasible triads ($\alpha$, $u_{1,1}$, $u_{2,1}$) requires a time of the order of $p^3 \cdot M^3$.

Observing TABLE III, it can be concluded that the number of feasible triads ($\alpha$, $u_{1,1}$, $u_{2,1}$) is of the order of $p^2$. After the determination of the feasible pairs ($u_{1,1}$, $u_{2,1}$) for a given $\alpha$, such pairs are employed to determine the corresponding sequence of $u_{2,i}$'s. The determination of all u's for a given $\alpha$ requires the execution of as many as $\log_p N_0$ supercongruences. Thus the execution time for all $\alpha$ would be of the order of $p^2 \cdot (p \cdot M^3) \cdot M$.

In particular, when p approximates the value of M, execution time is of the order of $p^7$.

3) The Case when $j_0=2$

3.1) Overview

Consider the case when a roster of candidate pairs $\{(\tilde{U}_{1,1}, \tilde{U}_{2,1})\}$ has been determined and none of the corresponding pairs (r, s) represent divisors of N. Thus a new variable, $\zeta_3$, can be introduced. The pair $\{(\tilde{U}_{1,1}, \tilde{U}_{2,1})\}$ is feasible only if there exists an integer $\zeta_3$ such that, $$\begin{cases} u_{M-1} = 0 \\ u_{M-2} = 0 \\ u_{M-3} \neq 0 \\ r = \tilde{A}_1 + \tilde{u}_1 \cdot + \tilde{\zeta}_2 \cdot p^2 + \zeta_3 \cdot p^3 + 2 \cdot \tilde{u}_2 \cdot p^2 + 2 \cdot \sum_{i=3}^{M-3} u_i \cdot p^i \\ s = \tilde{A}_1 - \tilde{u}_1 \cdot p + \tilde{\zeta}_2 \cdot p^2 + \zeta_3 \cdot p^3 \end{cases} \quad (175)$$

Notice that in (175) $u_1$, $u_2$ and $\zeta_2$ are known integers, say $\tilde{u}_1$, $\tilde{u}_2$ and $\tilde{\zeta}_2$. Multiplication of r by s modulo $p^M$ yields:

$$\begin{cases} u_{M-3} \neq 0 \\ u_{M-2} = 0 \\ u_{M-1} = 0 \\ v_0 \equiv \tilde{\omega}_0^2 (\bmod\ p^M) \\ v_1 \equiv 2 \cdot \tilde{\omega}_0 \cdot \omega_1 (\bmod\ p^{M-1}) \\ v_2 \equiv -\tilde{u}_1^2 + \tilde{\omega}_1^2 + 2 \cdot \tilde{\omega}_0 \cdot \tilde{\zeta}_2 + 2 \cdot \tilde{\omega}_0 \cdot \tilde{u}_2 (\bmod\ p^{M-2}) \\ v_3 \equiv 2 \cdot \tilde{\omega}_0 \cdot u_3 + 2 \cdot (\tilde{\omega}_1 - \tilde{u}_1) \cdot \tilde{u}_2 + 2 \cdot \tilde{\omega}_1 \cdot \tilde{\zeta}_2 + 2 \cdot \tilde{\omega}_0 \cdot \tilde{\zeta}_3 (\bmod\ p^{M-3}) \\ v_4 \equiv 2 \cdot \tilde{\omega}_0 \cdot u_4 + 2 \cdot (\tilde{\omega}_1 - \tilde{u}_1) \cdot u_3 + 2 \cdot \tilde{\zeta}_2 \cdot \tilde{u}_2 + 2 \cdot \tilde{\omega}_1 \cdot \zeta_3 + \tilde{\zeta}_2^2 (\bmod\ p^{M-4}) \\ v_5 \equiv 2 \cdot \tilde{\omega}_0 \cdot u_5 + 2 \cdot (\tilde{\omega}_1 - \tilde{u}_1) \cdot u_4 + 2 \cdot \tilde{\zeta}_2 \cdot u_3 + 2 \cdot \zeta_3 \cdot \tilde{u}_2 + 2 \cdot \tilde{\zeta}_2 \cdot \zeta_3 (\bmod\ p^{M-5}) \\ v_6 \equiv 2 \cdot \tilde{\omega}_0 \cdot u_6 + 2 \cdot (\tilde{\omega}_1 - \tilde{u}_1) \cdot u_5 + 2 \cdot \tilde{\zeta}_2 \cdot u_4 + 2 \cdot \zeta_3 \cdot u_3 + \zeta_3^2 (\bmod\ p^{M-6}) \\ \text{for } i > 6 \\ v_i \equiv 2 \cdot \tilde{\omega}_0 \cdot u_i + 2 \cdot (\tilde{\omega}_1 - \tilde{u}_1) \cdot u_{i-1} + 2 \cdot \tilde{\zeta}_2 \cdot u_{i-2} + 2 \cdot \zeta_3 \cdot u_{i-3} (\bmod\ p^{M-i}) \\ \ldots \\ v_{n-3} \equiv 2 \cdot \tilde{\omega}_0 \cdot u_{M-3} + 2 \cdot (\tilde{\omega}_1 - \tilde{u}_1) \cdot u_{M-4} + 2 \cdot \tilde{\zeta}_2 \cdot u_{M-5} + 2 \cdot \zeta_3 \cdot u_{M-6} (\bmod\ p^3) \\ v_{n-2} \equiv 2 \cdot (\tilde{\omega}_1 - \tilde{u}_1) \cdot u_{M-3} + 2 \cdot \tilde{\zeta}_2 \cdot u_{M-4} + 2 \cdot \zeta_3 \cdot u_{M-5} (\bmod\ p^2) \\ v_{n-1} \equiv 2 \cdot \tilde{\zeta}_2 \cdot u_{M-3} + 2 \cdot \zeta_3 \cdot u_{M-4} (\bmod\ p) \end{cases} \quad (176)$$

For each initial selection of the pair $(u_1, u_2)$, the system (176) may produce a triad $(u_1, u_2, \zeta_3)$ such that $r \cdot s \equiv N \pmod{p^4}$.

3.2) Determination of $u_3$ (mod p) using (176)

STEP 1: Select an element of the roster $\{(u_1, u_2)\}$ representing a solution of (142), say $(\tilde{U}_{1,1}, \tilde{U}_{2,1}|M)$.

STEP 2: Using (94), compute $v_3$ (mod $p^{M-3}$), say $\tilde{v}_{3,1}$. The same result can be obtained by observing that in (176) the congruence which is defined modulo $p^{M-3}$ can be written as follows:

$$0 \equiv -2 \cdot \tilde{\omega}_0 \cdot v_{3,1} - 2 \cdot \tilde{\omega}_1 \cdot \tilde{v}_{2,2} - 2 \cdot \tilde{U}_{1,1} \cdot \tilde{U}_{2,1} (\bmod\ p^{M-3}). \quad (177)$$

This congruence does not contain $u_3$ and allows one to determine $v_{3,1}$ modulo $p^{M-3}$.

STEP 3: To compute an integer $u_3$ (mod p) which satisfies (176), select an initial value of $u_3$ (mod p), say $\tilde{u}_{3,1}$.

STEP 4: Compute a corresponding value of $\zeta_3$, say $\tilde{\zeta}_{3,1}$, where $$\tilde{\zeta}_{3,1} = \tilde{\omega}_3 \cdot \tilde{v}_{3,1} - \tilde{u}_{3,1} \quad (178)$$

STEP 5: Substitute $\tilde{U}_{1,1}$, $\tilde{U}_{2,2}$ and $\tilde{\zeta}_2$ in lieu of $u_1$, $u_2$ and $\zeta_2$ into (176). Also, substitute $\tilde{\zeta}_{3,1}$ in lieu of $\zeta_3$ into (176). Solve the congruences (176) starting with the condition on $v_4$ and proceeding to the condition on $v_{n-3}$ (mod $p^3$). The last two congruences of (176) verify the consistency of $u_{M-3}$ with the corresponding LHS's, which are defined modulo $p^2$ and modulo p, respectively. In the event such a consistency is satisfied, a value of $u_{M-3}$ (mod p) is produced and $\tilde{u}_{3,1}$ is validated.

All possible selections of $\tilde{u}_{3,1}$ must be tested. If no selection of $\tilde{u}_{3,1}$ satisfies (176) for the given pair $(u_{1,1}, u_{2,1}|M)$, then such a pair must be discarded.

3.3) Validation of $u_{2,2}$

The integer $u_{3,1}$ produced by (176) should be consistent with the value of $u_{2,2}$ produced by (167). However, there are many selections of $(u_{1,1}, u_{2,1})$ which, by (167), produce a corresponding $u_{2,2}$ and, by (176), do not produce any corresponding $u_{3,1}$.

Thus it appears that (176) is more severe than (167) in the determination of $u_{3,1}$.

Therefore, it is possible to execute (176) for all the confirmed pairs $(u_{1,1}, u_{2,1})$ which survive (142) and are listed in TABLE III and produce a corresponding roster of viable triads $(u_{1,1}, u_{2,1}, u_{3,1})$.

This step depopulates TABLE III drastically. Compare TABLE VII with TABLE VIII.

TABLE VIII

Example of Feasible $(u_{1,1}, u_{2,1}, u_{3,1})$Triads for Increasing M and p = 29 using Supercongruence (176)

| M | $(u_{1,1}, u_{2,1}, u_{3,1})$ |
|---|---|
| 65 | (3, 20, 6), (6, 28, 4) |
| 129 | (23, 1, 25) |
| 257 | (23, 1, 25) |
| 513 | (3, 20, 6), (6, 28, 4) |
| 1025 | (13, 8, 17), (15, 4, 28), (23, 1, 25) |
| 2049 | (23, 1, 25) |
| 4097 | (3, 20, 6), (6, 28, 4) |

TABLE IX

Calculation of $u_{2,i}$ and $v_i$ for i > 2

Calculation of $u_{2,n}$

| $u_1$ | $u_{2,1}$ | $u_{2,2}$ | $u_{2,3}$ | $u_{2,4}$ | $u_{2,5}$ | $u_{2,6}$ | $u_{2,7}$ | $u_{2,8}$ | $u_{2,9}$ |
|---|---|---|---|---|---|---|---|---|---|
| 3 | 20 | 6 | 18 | 3 | 28 | 25 | 9 | 12 | I |

Calculation of $v_1$

| $v_2$ | $v_3$ | $v_4$ | $v_5$ | $v_6$ | $v_7$ | $v_8$ | $v_9$ | $v_{10}$ |
|---|---|---|---|---|---|---|---|---|
| 24 | 17 | 25 | 12 | 2 | 9 | 21 | 18 | 7 |

This corresponds to the factor $s_0$ = 605555653519.

3.4) Execution Time

After the depopulation of Table VII into Table VIII, the algorithm of Section 2.9 can resume and determine the appropriate $u_{2,1}$'s, for all i>2. For the example of Table I, Table IX shows the resulting values of $u_{2,i}$ and $v_i$ for all i>2.

The benefit of the validation of $u_{2,2}$ is the reduction of the total execution time by a factor of approximately p, thus reducing the total execution time to approximately $p^6$.

XI. AN ALTERNATIVE APPROACH TO THE HIGHER POWERS OF p

1) The Approach

Consider the case when the triad $(\tilde{\alpha}, \tilde{U}_{1,1}, \tilde{U}_{2,2})$ is a solution of (142) and (150), when N is to defined as in (37) and M is used in lieu of $n_0$.

In this case, it is possible to compute $r_0$ modulo $p^4$ as $$r_0 = \tilde{T}_0^{-1} \cdot r \pmod{p^4} \tag{179}$$

where $$r = \tilde{\omega}_0 + (\tilde{\omega}_1 + \tilde{u}_{1,1}) \cdot p + (\tilde{\omega}_2 - \tilde{v}_{2,2} + \tilde{U}_{2,2}) \cdot p^2 \pmod{p^4}. \tag{180}$$

Define $\tilde{r}_{0,2}$ as the least positive solution of the following:

$$r_{0,2} = \tilde{T}_0^{-1} (\tilde{\omega}_0 + (\tilde{\omega}_1 + \tilde{u}_{1,1}) \cdot p) \pmod{p^M}. \tag{181}$$

Define $\tilde{T}_2$ as the least positive solution of the following:

$$N_0 = \tilde{T}_2 \cdot \tilde{r}_{0,2}^2 \pmod{p^M}. \tag{182}$$

If $\tilde{T}_2$ is odd, define $$N_2 = \tilde{T}_2 \cdot N_0. \tag{183}$$

Define $\tilde{A}_2$ as a solution of the following $$N_2 \equiv \tilde{A}_2^{-2} \pmod{p^M}. \tag{184}$$

Then the general expression of the pair (r,s) will be $$\begin{cases} r = \tilde{A}_2 + U(\tilde{T}_2) \cdot p^2 - V(\tilde{T}_2) \cdot p^4 \\ s = \tilde{A}_2 + U(\tilde{T}_2) \cdot p^2 - V(\tilde{T}_2) \cdot p^4 \end{cases}, \tag{185}$$

for some integers $U(\tilde{T}_2)$ and $V(\tilde{T}_2)$.

Compare with (41).

Notice that (41) and (185) operate on rectangular lattices of sides $p^2$ and $p^4$. Compare with (24).

NOTE 1: The integers $u_2$ and $U(T_2)$ are related to each other. In fact, $$\begin{cases} \tilde{T}_0 \equiv N_0 \cdot \alpha^{-2} \pmod{p^M} \\ \tilde{T}_2 \equiv N_0 \cdot r_{0,2}^{-2} \pmod{p^M} \end{cases} \tag{186}$$

and $$U(\tilde{T}_2) \equiv \tilde{T}_2 \cdot \tilde{T}_0^{-1} \cdot \tilde{U}_{2,2} \pmod{p^4}. \tag{187}$$

Thus $U_{2,2}$ is a known quantity, and the solution of (183) follows the pattern of (142).

NOTE 2: In (142) the congruences modulo $p^n$ and $p^{n-1}$ do not depend explicitly on the variables of the system ($u_i$ and $v_i$), because such dependence is embedded in the definition of N. Likewise, the four highest degree congruences (say $p^M$, $P^{M-1}$, $p^{M-2}$, $p^{M-3}$) do not depend explicitly on the corresponding variables.

XII. THE CASE WHEN $\tilde{u}_1 \equiv 0 \pmod{p}$

Consider the case when $N_0$ is known not to be a prime number, and the algorithm does not determine any divisor of $N_0$ for any $\tilde{\alpha}$ and for $\tilde{u}_1 \not\equiv 0 \pmod{p}$.

It has been observed that, given p, this situation occurs in less than 1% of the integers under test.

The problem can be addressed by defining $\tilde{T}_2$ as a solution of the following:

$$N_0 = \tilde{T}_2 \cdot \alpha^2 \pmod{p^M} \tag{188}$$

and restating (185) accordingly. In this case, a solution of (185) may exist only if $U(\tilde{T}_2) \not\equiv 0 \pmod{p^2}$.

One possible strategy is to select a different prime, say p', relying on the low probability that $\tilde{u}$ be congruent to zero both modulo p and modulo p'. Of course, it is also possible to execute the proposed algorithm in parallel using both p and p'.

XIII. THE CASES WHEN $\omega_1^2 - u_1^2 \equiv 0 \pmod{p}$

A similar situation may occur when $\omega_1^2 - u_1^2 \equiv 0 \pmod{p}$. This situation was observed in less than 1% of the cases under test. Again duplicating the algorithm using a different prime may solve the problem.

XIV. OTHER SINGULAR EVENTS

A variety of rare, singular events occur occasionally. Some of the Tables presented in this document describe unexpected events. Gradually, such events are being understood. All of them can be sidestepped by changing the selection of p.

Fundamentally, the proposed representation of integers and the resulting management of the carries offer a primary avenue towards the control of the factorization problem.

APPENDIX

A NOTE ON CONGRUENCES WITH TRUNCATED VARIABLES

Consider the linear congruence $$A \cdot x + B \cdot y \equiv C \pmod{p^2} \quad (A.1)$$

where $A \not\equiv 0 \pmod p$ and $B \not\equiv 0 \pmod p$.
Let $$\begin{cases} x = x_0 + x_1 \cdot p \\ y = y_0 + y_1 \cdot p \end{cases} \quad (A.2)$$

Consider the case when x and y are constrained by the conditions that $0 \le x_0, y_0 \le p-1$ to and also $x_1=0$ and $y_1=0$. In other words, x and y are "truncated" modulo p.

To solve (A.1) under these constraints, let $C = c_0 + c_1 \cdot p$ and solve $$A \cdot x + B \cdot y \equiv c_0 \pmod{p}. \quad (A.3)$$

There exist p solution pairs $(x_0, y_0)$ for this congruence. For each solution pair, compute the integer $$\lambda \cdot p = A \cdot x_0 + B \cdot y_0 - c_0. \quad (A.4)$$

Depending on the value of $c_1$, there may be one or more solution pairs which satisfy (A.1), even though x and y are truncated modulo p. Also, in some cases, there is no solution pair for which $\lambda \equiv c_1 \pmod p$.

The situation is illustrated by Table A.I, which shows the case when $p=29$, $A=38$, $B=41$, $c_0=2$, $c_1=13$.

The example illustrates the fact that a pair $(x_0, y_0)$, which was truncated modulo p, may satisfy a congruence modulo $p^2$.

TABLE A.1

Example of Truncated Linear Congruence
($p = 29$, $A = 38$, $B = 41$, $c_0 = 2$, $c_1 = 13$)

| $(x_0, y_0)$ | $A \cdot x_0 + B \cdot y_0 - c_0$ | $c_1 \cdot p$ |
|---|---|---|
| (0, 5) | 7 · p | 13 p |
| (1, 26) | 9 p | 13 · p |
| (2, 18) | 28 p | 13 · p |
| (3, 10) | 18 p | 13 p |
| (4, 2) | 8 p | 13 p |
| (5, 23) | 10 · p | 13 p |
| (6, 15) | 0 p | 13 p |
| (7, 7) | 19 · p | 13 · p |
| (8, 28) | 21 p | 13 · p |
| (9, 20) | 11 · p | 13 p |
| (10, 12) | 1 · p | 13 · p |
| (11, 4) | 20 · p | 13 p |
| (12, 25) | 22 p | 13 p |
| (13, 17) | 12 · p | 13 p |
| (14, 9) | 2 · p | 13 · p |
| (15, 1) | 21 · p | 13 · p |
| (16, 22) | 23 · p | 13 p |
| (17, 14) | 13 · p | 13 · p |
| (18, 6) | 3 · p | 13 · p |
| (19, 27) | 5 · p | 13 · p |
| (20, 19) | 24 p | 13 · p |
| (21, 11) | 14 · p | 13 · p |
| (22, 3) | 4 · p | 13 · p |
| (23, 24) | 6 p | 13 · p |
| (24, 16) | 25 · p | 13 · p |
| (25, 8) | 15 · p | 13 · p |
| (26, 0) | 5 p | 13 · p |
| (27, 21) | 7 · p | 13 · p |
| (28, 13) | 26 · p | 13 · p |
| Number of $(x_0, y_0)$ pairs | 29 | |
| $(x_0, y_0)$ | $A \cdot x_0 + B \cdot y_0 - c_0$ | $c_1 \cdot p$ |
| Double Solutions | | 5, 7, 21 |
| No Solutions | | 16, 17, 27 |

REFERENCES (All of which are incorporated by reference, herein)

[1] C. F. Gauss, *Disquisitiones Arithmeticae*, New York, N.Y.: Springer-Verlag, 1986.
[2] R. L. Rivest, A. Shamir, L. Adleman, "A Method for Obtaining Digital Signatures and Public-Key Cryptosystems," *Communications of the ACM*, Vol. 21, pp. 120-125, 1978.
[3] G. H. Hardy, E. M. Wright, *In Introduction to the Theory of Numbers*, Oxford, U. K., The Clarendon Press, 1979.

Following is a list of relevant features of the invention.

The present invention pertains to a method for decoding an encrypted electromagnetic signal W representative of a message encoded by a first computer with public key $N_0 = r \times s$, where $N_0$, r and s are integers and W is a function of r and s. The method comprises the steps of storing the signal W in a non-transient memory. There is the step of decoding with a second computer in communication with the memory the signal W in the memory with the second computer generated steps of selecting a prime number p of the form $p = 4k+1$ for an odd integer k such that the public key $N_0$ is a non-quadratic residue modulo p; calculating $n_0$ satisfying the inequalities $p^{n_0-1} < N_0 < p^{n_0}$ computing $N = \tau N_0$ with a selection of $\tau$ such that N is a quadratic residue modulo $p^{n_0}$; calculating n satisfying the inequalities $p^{n-1} < N < p^n$ and calculating a solution to $$N \equiv A^2 \pmod{p^n} \quad (189)$$

by using the representation $$A = \sum_{i=0}^{n} \omega_i p^i \quad (190)$$

where $w_i$ satisfies the condition $$0 < \omega_i < p^{n-i}. \quad (191)$$

There is the step of decrypting with the computer the signal W with the public key $N_0$ and the prime factors of integer $N_0$. There is the step of displaying on a display by the computer the decrypted signal W. There is the step of reviewing the decrypted signal W to determine if the decrypted signal W indicates an act has occurred or will occur that violates a law, or will violate a law.

There may be the second computer generated steps of defining $M = 2^h + 1$, for $N = r \times s$ with $r > s$, take the solution 1 and construct relations $$\begin{cases} r = A + U \times p - V \times p^2 \\ s = A - U \times p - V \times p^2 \end{cases} \quad (192)$$

with U, V as unknowns; forming a set of Supercongruence equations by matching coefficients of N and coefficients of $(A+U\times p-V\times p^2)(A-U\times p-V\times p^2)$, the set of Supercongruence equations establishes M relations in terms of $u_i$'s and $v_i$'s, which are coefficients of U and V respectively; performing steps 1-4 using the Supercongruence equations where steps 1-7 are as follows:

1) Testing feasibilities of digits $u_1$'s and $u_2$'s.

2) Calculating carries by tallying differences on two sides of the Supercongruence equations.

3) Using carries to identify subsequent digits given a feasible pair of $u_1$ and $u_2$ by using Supercongruence equations again.

4) Using the Euclidean algorithm to test whether $A+U\times p-V\times p^2$ is a divisor of $N_0$.

There may be the step of enabling the alerting of a government agency to prevent the act that will occur to prevent physical damage or bodily injury to a person occurring. The steps described herein allows for the ability to alert a desired government agency if a review of the decrypted signal W indicates that an alert is warranted.

By using the methods described herein, $N_0$ is factored in time $O(\log^6 N_0)$. This speed is important, which only the operation of the second computer performing the second computer generated steps can achieve, because by having this speed for factoring, the signal W representative of a message can be effectively decrypted and deciphered in real time so any threat to property or individuals can be quickly acted upon to eliminate the threat before it occurs and actual damage to property or injury to individuals is prevented or mitigated. In other words, for W to be effectively understood, it must by decrypted fast enough that any threat identified in W can be stopped. The present invention with the use of the second computer allows for this capability. Here, it is inherent that to save lives if required, the second computer is required.

There may be the step of obtaining the electromagnetic signal W representative of a message from a telecommunications network, or a data network or an Internet or a non-transient memory. Law enforcement departments, such as Homeland Security, the FBI, the CIA, NSA, state and local Police or the Military have the well-known capability of obtaining or intercepting messages sent encrypted by a first computer operated by a potential terrorist or criminal as an electromagnetic signal, such as by smart phone or computer or internet, or stored in the memory of a smart phone or computer, or a flash drive. The encrypted electromagnetic signal W can be extracted from such messages or memories and operated upon by the techniques described herein to decrypt the encrypted messages and read them to determine whether there is any violation of law or threat to property or individuals. Of course, the intended recipient of the encrypted message W by the first computer has the key so the recipient can decrypt the encrypted message W the recipient has received and understand it. It is the object of this invention, and the problem this invention solves, to allow a recipient of the encrypted message W who does not have the key to read it, to determine what the key $N_0$ is by the techniques described here, and then using the determined key $N_0$, decrypting the encrypted message W, reviewing what the decrypted message says, and acting as necessary to protect property damage or bodily injury or any type of crime, as deemed appropriate.

The present invention pertains to a second computer for decoding an encrypted electromagnetic signal W representative of a message encoded by a first computer with public key $N_0=r\times s$, where $N_0$, r and s are integers and W is a function of r and s, comprising:

a non-transient memory in which the signal W is stored;

decoding with a CPU in communication with the memory the signal W in the memory that decodes the signal W by the second computer generated steps of selecting a prime number p of the form $p=4k+1$ for an odd integer k such that the public key $N_0$ is a non-quadratic residue modulo p; calculating $n_0$ satisfying the inequalities $p^{n_0-1}<N_0<p^{n_0}$ computing $N=\tau N_0$ with a selection of $\tau$ such that N is a quadratic residue modulo $p^{n_0}$; calculating n satisfying the inequalities $p^{n-1}<N<p^n$; and calculating a solution to $$N \equiv A^2 \pmod{p^n} \tag{193}$$

by using the representation $$A = \sum_{i=0}^{n} \omega_i p^i \tag{194}$$

where $w_i$ satisfies the condition $$0<\omega_i<p^{n-i}, \tag{195}$$

the CPU decrypting the signal W with the public key $N_0$ and the prime factors of integer $N_0$; and a display on which the decrypted signal W is displayed so the decrypted signal W can be reviewed to determine if the decrypted signal W indicates an act has occurred or will occur that violates a law or will violate a law. The display can be a computer screen or smart phone screen or any screen or piece of paper on which the decrypted signal W is printed or any medium on which the decrypted signal W can be reviewed.

The CPU of the second computer may perform the CPU generated steps of defining $M=2^h+1$ for $N_0=r\times s$ with $r>s$, take the solution 1 and construct relations $$\begin{cases} r = A + U \times p - V \times p^2 \\ s = A - U \times p - V \times p^2 \end{cases} \tag{196}$$

with U, V as unknowns; forming a set of Supercongruence equations by matching coefficients of N and coefficients of $(A+U\times p-V\times p^2)(A-U\times p-V\times p^2)$, the set of Supercongruence equations establishes M relations in terms of $u_i$'s and $v_i$'s, which are coefficients of U and V respectively; performing steps 1-4 using the Supercongruence equations where steps 1-4 are as follows:

1) Testing feasibilities of digits $u_1$'s and $u_2$'s.

2) Calculating carries by tallying differences on two sides of the Supercongruence equations.

3) Using carries to identify subsequent digits given a feasible pair of $u_1$ and $u_2$ by using Supercongruence equations again.

4) Using the Euclidean algorithm to test whether $A+U\times p-V\times p^2$ is a divisor of $N_0$.

$N_0$ is factored by the CPU of the second computer in the time $O(\log^6 N_0)$.

The present invention pertains to a non-transitory readable storage medium which includes a computer program stored on the storage medium for decoding an encrypted electromagnetic signal W encoded by a first computer with public key $N_0=r\times s$, where $N_0$, r and s are integers and W is a function of r and s, where the signal W has been stored in a non-transient memory of a second computer, having the second computer generated steps of:

Selecting a prime number p of the form $p=4k+1$ for an odd integer k such that the public key $N_0$ is a non-quadratic residue modulo p; calculating $n_0$ satisfying the inequalities $p^{n_0-1}<N_0<p^{n_0}$ computing $N=\tau N_0$ with a selection of $\tau$ such that N is a quadratic residue modulo $p^{n_0}$; calculating n satisfying the inequalities $p^{n-1}<N<p^n$; and calculating a solution to $$N \equiv A^2 \pmod{p^n} \qquad (197)$$

by using the representation $$A = \sum_{i=0}^{n} \omega_i p^i \qquad (198)$$

where $w_i$ satisfies the condition $$0<\omega_i<p^{n-1}. \qquad (199)$$

There is the step of decrypting with the second computer the signal W with the public key $N_0$ and the prime factors of integer $N_0$. There is the step of displaying on a display by the second computer the decrypted signal W. There is the step of reviewing the decrypted signal W for predetermined words to determine if the decrypted signal W indicates an act has occurred or will occur that violates a law, or will violate a law. It is well know in the art to search for words, such as bomb or gun, to flag a message for further review for possible action, as deemed appropriate.

The computer program may have the second computer generated steps of defining $M=2^h+1$ for $N_0=r \times s$ with $r>s$, take the solution 1 and construct relations $$\begin{cases} r = A + U \times p - V \times p^2 \\ s = A - U \times p - V \times p^2 \end{cases} \qquad (200)$$

with U, V as unknowns; forming a set of Supercongruence equations by matching coefficients of N and coefficients of $(A+U \times p-V \times p^2)(A-U \times p-V \times p^2)$, the set of Supercongruence equations establishes M relations in terms of $u_i$'s and $v_i$'s, which are coefficients of U and V respectively; performing steps 1-4 using the Supercongruence equations where steps 1-4 are as follows:

1) Testing feasibilities of digits $u_i$'s and $v_i$'s.
2) Calculating carries by tallying differences ontwo sides of the Supercongruence equations.
3) Using carries to identify subsequent digits given a feasible pair of $u_1$ and $u_2$ by using Supercongruence equations again.
4) Using the Euclidean algorithm to test whether $A+U \times p-V \times p^2$ is a divisor of $N_0$.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method for decoding an encrypted electromagnetic signal W encoded by a first computer with public key $N_0=r \times s$, where $N_0$, r and s are integers comprising the steps of:

obtaining the electromagnetic signal W from a telecommunications network, or a data network or an Internet or a first non-transient memory;

storing the signal W in a second non-transient memory;

decoding with a second computer in communication with the second non-transient memory the signal W in the memory by factoring the public key $N_0$ in time $O(\log^6 N_0)$ with the second computer generated steps of selecting a prime number p of the form $p=4k+1$ for an odd integer k such that the public key $N_0$ is a non-quadratic residue modulo p; Calculating $n_0$ satisfying the inequalities $p^{n_0-1}<N_0<p^{n_0}$; Computing $N=\tau N_0$ with a selection of $\tau$ such that N is a quadratic residue modulo p; Calculating n satisfying the inequalities $p^{n-1}<N<p^n$; and Calculating a solution to $$N \equiv A^2 \pmod{p^n}$$

by using the representation $$A = \sum_{i=0}^{n} \omega_i p^i$$

where $\omega_i$ satisfies the condition $$0<\omega_i<p^{n-i};$$

decrypting with the second computer the signal W with the public key $N_0$ and prime factors of integer $N_0$;

displaying on a display by the second computer the prime factors of integer $N_0$; and reviewing the decrypted signal W for predetermined words with the second computer to determine if the decrypted signal W indicates an act has occurred or will occur that violates a law, or will violate a law, wherein the signal W representative of the message is effectively decrypted and deciphered thereby a threat to property or individuals in violation of the law can be acted upon to mitigate or eliminate the threat before the threat occurs and actual damage to property or injury to individuals is prevented or mitigated.

2. The method of claim 1 including the second computer generated steps of defining $M=2^h+1$, for $N=r \times s$ with $r>s$, and constructing relations $$\begin{cases} r = A + U \times p - V \times p^2 \\ s = A - U \times p - V \times p^2 \end{cases}$$

with U, V as unknowns;

forming a set of Supercongruence equations by matching coefficients of N and coefficients of $(A+U \times p-V \times p^2)(A-U \times p-V \times p^2)$, the set of Supercongruence equations establishes M relations in terms of $u_i$'s and $v_i$'s, which are coefficients of U and V respectively;

performing steps 1-4 using the Supercongruence equations where steps 1-4 are as follows:

1) Testing feasibilities of digits $u_1$'s and $u_2$'s.
2) Calculating carries by tallying differences on two sides of the Supercongruence equations.
3) Using carries to identify subsequent digits given a feasible pair of $u_1$ and $u_2$ by using Supercongruence equations again.
4) Using the Euclidean algorithm to test whether $A-U-p-V \times p^2$ is a divisor of $N_0$.

3. The method of claim 2 enabling alerting a government agency to prevent the act that will occur to prevent physical damage or bodily injury to a person occurring.

4. A second computer for decoding an encrypted electromagnetic signal W encoded by a first computer with public key $N_0=r \times s$, where $N_0$, r and s are integers and W is a function of r and s, comprising:
  an input for obtaining the electromagnetic signal W from a telecommunications network, or a data network or an Internet or a first non-transient memory
  a second non-transient memory in communication with the input in which the signal W is stored;
  a cpu in communication with the second non-transient memory the signal W in the memory that decodes the signal W by factoring the public key $N_0$ in time $O(\log^6 N_0)$ by the second computer generated steps of selecting a prime number p of the form $p=4k+1$ for an odd integer k such that the public key $N_0$ is a non-quadratic residue modulo p; calculating $n_0$ satisfying the inequalities $p^{n_0-1} < N_0 < p^{n_0}$; computing $N = \tau N_0$ with a selection of $\tau$ such that N is a quadratic residue modulo p; calculating n satisfying the inequalities $p^{n-1} < N < p^n$; and calculating a solution to $$N \equiv A^2 \pmod{p^n}$$

by using the representation $$A = \sum_{i=0}^{n} \omega_i p^i$$

where $\omega_i$ satisfies the condition
$0 < \omega_i < p^{n-i}$, the cpu decrypting the signal W with the public key $N_0$ and prime factors of integer $N_0$; and
  the cpu reviewing the decrypted signal W for predetermined words to determine if the decrypted signal W indicates an act has occurred or will occur that violates a law, or will violate a law, wherein the signal W representative of the message is effectively decrypted and deciphered thereby a threat to property or individuals in violation of the law can be quickly acted upon to eliminate the threat before the threat occurs and actual damage to property or injury to individuals is prevented or mitigated.

5. The apparatus of claim 4 wherein the cpu of the second computer performs the cpu generated steps of defining $M=2^h+1$, for $N=r \times s$ with $r \times s$, and constructing relations $$\begin{cases} r = A + U \times p - V \times p^2 \\ s = A - U \times p - V \times p^2 \end{cases}$$

with U, V as unknowns;
forming a set of Supercongruence equations by matching coefficients of N and coefficients of $(A+U \times p - V \times p^2)(A - U \times p - V \times p^2)$, the set of Supercongruence equations establishes M relations in terms of $u_i$'s and $v_i$'s, which are coefficients of U and V respectively;
performing steps 1-4 using the Supercongruence equations where steps 1-4 are as follows:
  1) Testing feasibilities of digits $u_1$'s and $u_2$'s.
  2) Calculating carries by tallying differences on two sides of the Supercongruence equations.
  3) Using carries to identify subsequent digits given a feasible pair of $u_1$ and $u_2$ by using Supercongruence equations again.
  4) Using the Euclidean algorithm to test whether $A - U \times p - V \times p^2$ is a divisor of $N_0$.

6. A non-transitory readable storage medium which includes a computer program stored on the storage medium for decoding an encrypted electromagnetic signal W encoded by a first computer with public key $N_0 = r \times s$, where $N_0$, r and s are integers and W is a function of r and s, where the signal W has been stored in a second non-transient memory of a second computer, and the second computer factoring the public key $N_0$ in time $O(\log^6 N_0)$, the signal W obtained from a telecommunications network, or a data network or an Internet or a first non-transient memory, the computer program having the second computer generated steps of:
  selecting a prime number p of the form $p=4k+1$ for an odd integer k such that the public key $N_0$ is a non-quadratic residue modulo p; calculating $n_0$ satisfying the inequalities $p^{n_0-1} < N_0 < p^{n_0}$; computing $N = \tau N_0$ with a selection of $\tau$ such that N is a quadratic residue modulo p; calculating n satisfying the inequalities $p^{n-1} < N < p^n$; and calculating a solution to $$N \equiv A^2 \pmod{p^n}$$

by using the representation $$A = \sum_{i=0}^{n} \omega_i p^i$$

where $\omega_i$ satisfies the condition $0 < \omega_i < p^{n-i}$;

decrypting with the second computer the signal W with the public key $N_0$ and prime factors of integer $N_0$;
displaying on a display by the second computer the decrypted signal W; and
reviewing the decrypted signal W for predetermined words to determine if the decrypted signal W indicates an act has occurred or will occur that violates a law, or will violate a law, wherein the signal W representative of the message is effectively decrypted and deciphered thereby a threat to property or individuals in violation of the law can be quickly acted upon to eliminate the threat before the threat occurs and actual damage to property or injury to individuals is prevented or mitigated.

7. The storage medium of claim 6 having the second computer generated steps of defining $M=2^h+1$, for $N=r \times s$ with $r > s$, and constructing relations $$\begin{cases} r = A + U \times p - V \times p^2 \\ s = A - U \times p - V \times p^2 \end{cases}$$

with U, V as unknowns;
forming a set of Supercongruence equations by matching coefficients of N and coefficients of $(A+U \times p - V \times p^2)(A - U \times p - V \times p^2)$, the set of Supercongruence equations establishes M relations in terms of $u_i$'s and $v_i$'s, which are coefficients of U and V respectively;
performing steps 1-4 using the Supercongruence equations where steps 1-4 are as follows:
  1) Testing feasibilities of digits $u_1$'s and $u_2$'s.
  2) Calculating carries by tallying differences on two sides of the Supercongruence equations.
  3) Using carries to identify subsequent digits given a feasible pair of $u_1$ and $u_2$ by using Supercongruence equations again.

4) Using the Euclidean algorithm to test whether $A-U \times p - V \times p^2$ is a divisor of $N_0$.

* * * * *

UNITED STATES PATENT AND TRADEMARK OFFICE
CERTIFICATE OF CORRECTION

Page 1 of 2

PATENT NO. : 10,298,393 B1
APPLICATION NO. : 16/044096
DATED : May 21, 2019
INVENTOR(S) : Giorgio Coraluppi It is certified that error appears in the above-identified patent and that said Letters Patent is hereby corrected as shown below:

In the Specification

In Column 3, after Line 8, insert equation (9): --$0 < \omega_i < p^{n-i}$.--

In Column 4, Line 25, replace "A0 and p0" with "$\lambda_0$ and $\mu_0$".

In Column 4, Line 43, replace "antisymmetric to components" with "antisymmetric components".

In Column 9, Line 40, replace " $\begin{cases} \tilde{\omega}_i + \bar{\omega}_i = p^{5-i} \\ 0 < \tilde{\omega}_i < p^{6-i} \end{cases}$ " with " $\begin{cases} \tilde{\omega}_i + \bar{\omega}_i = p^{5-i} \\ 0 < \tilde{\omega}_i < p^{5-i} \end{cases}$ "

In Column 10, Line 9, replace "to," with "$\omega_i$".

In Column 10, Line 41, replace "$N_1 10 + 2 \cdot p \equiv (181{,}200 + 18{,}120 \cdot p + 1{,}291 \cdot p^2 + 23 \cdot p^3 + 2 \cdot p^4)^2 (mod\, p^5)$" with "$N_1 = 10 + 2 \cdot p \equiv (181{,}200 + 18{,}120 \cdot p + 1{,}291 \cdot p^2 + 23 \cdot p^3 + 2 \cdot p^4)^2 (mod\, p^5)$".

In Column 13, Line 66, replace "$i - M + j$" with "$i = M + j$".

In Column 15, Line 51, replace "$p^2 \cdot p^{M-6}$" with "$p^{2 \cdot M-6}$".

In Column 15, Line 52, replace "$p^2 \cdot p^{M-5}$" with "$p^{2 \cdot M-5}$".

In Column 20, Line 23, replace "$z_k = \tilde{\omega}_k - v_k u_k$" with "$z_k = \tilde{\omega}_k - v_k + u_k$".

In Column 29, replace Table II, PART 2 with

Signed and Sealed this
Twenty-seventh Day of August, 2019

Andrei Iancu
*Director of the United States Patent and Trademark Office*

TABLE II – PART 2

Feasible $(u_{1,1}, u_{2,1})$ Pairs for the Example of TABLE I with Increments of $M$ by $2^3$

| $M$ | $(u_{1,1}, u_{2,1})$ |
|---|---|
| 2049 | (1, 0), (4, 19), (4, 20), (5, 8), (6, 9), (6, 16), (12, 7), (12, 15), (12, 26), (13, 16), (13, 26), (15, 0), (15, 6), (15, 25), (19, 26), (20, 22), (21, 2), (21, 8), (21, 26), (23, 1), (23, 22), (23, 28), (25, 7) |
| 4097 | (1, 1), (3, 20), (3, 27), (3, 28), (4, 1), (5, 15), (5, 22), (6, 1), (6, 7), (6, 28), (7, 14), (8, 14), (10, 28), (11, 25), (12, 2), (12, 9), (13, 19), (15, 3), (15, 4), (15, 26), (16, 10), (17, 20), (18, 5), (19, 5), (19, 15), (19, 17), (19, 25), (22, 10), (23, 20), (23, 23), (23, 26), (24, 9), (25, 28), (27, 3), (27, 25) |
| 8193 | (3, 6), (5, 28), (6, 1), (6, 7), (6, 28), (9, 28) (13, 25), (14, 4), (14, 25), (15, 6), (15, 27), (16, 2), (16, 13), (17, 22), (18, 14), (19, 12), (20, 15), (20, 26), (23, 13), (23, 18), (23, 20), (24, 23), (24, 26), (25, 11), (26, 20), (26, 27), (28, 6), (28, 11) |
| 16385 | (1, 28), (3, 5), (5, 15), (5, 23), (6, 1), (6, 7), (6, 28), (8, 3), (8, 27), (9, 7), (12, 4), (14, 23), (16, 3), (16, 21), (16, 23), (17, 3), (18, 19), (18, 23), (19, 0), (19, 4), (19, 8); (20, 0), (20, 3), (23, 14), (23, 20), (24, 21), (25, 9), (27, 3), (28, 1) |
| 32769 | (1, 1), (3, 20), (3, 28), (4, 22), (6, 1), (6, 7), (6, 28), (7, 14), (8, 14), (8, 21), (10, 3), (10, 28), (12, 9), (14, 0), (14, 4), (15, 4), (16, 13), (17, 14), (17, 20), (17, 22), (18, 5), (19, 5), (19, 17), (19, 25), (23, 13), (23, 20), (23, 23), (25, 10), (25, 28), (27, 25), (28, 0) |

In Column 33, Line 34, replace "$\zeta_{2,2} = \tilde{\omega}_2 \tilde{v}_2 - U_{2,2}$" with "$\zeta_{2,2} = \tilde{\omega}_2 - \tilde{v}_2 - U_{2,2}$".

In Column 34, Line 27, replace "$-u_{2,2} \equiv \tilde{\omega}_3 v_3 - u_3 \pmod{p}$" with "$-u_{2,2} \equiv \tilde{\omega}_3 - v_3 - u_3 \pmod{p}$".

In Column 39, Line 18, replace "$0 \leq x_0, y_0 \leq p - 1$ to and" with "$0 \leq x_0, y_0 \leq p - 1$ and".